(12) United States Patent
Delvaux et al.

(10) Patent No.: US 6,646,576 B1
(45) Date of Patent: Nov. 11, 2003

(54) SYSTEM AND METHOD FOR PROCESSING DATA

(75) Inventors: Marc Delvaux, Metuchen, NJ (US); Ronen Habot, Ocean, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 0 days.

(21) Appl. No.: 10/177,437

(22) Filed: Jun. 20, 2002

Related U.S. Application Data

(60) Provisional application No. 60/300,966, filed on Jun. 26, 2001.

(51) Int. Cl.[7] .............................................. H03M 7/00
(52) U.S. Cl. ............................ 341/60; 341/65; 341/70; 341/168; 709/247; 709/238; 709/217; 711/202; 711/15
(58) Field of Search ............................. 341/60, 65, 70, 341/168, 55, 164; 709/217, 219, 218, 247, 238; 711/15, 202

(56) References Cited

U.S. PATENT DOCUMENTS

| 4,242,675 A | * | 12/1980 | Boone et al. ................ 345/168 |
| 4,276,656 A | * | 6/1981 | Petryk, Jr. .................. 398/141 |
| 5,471,594 A | * | 11/1995 | Stone .......................... 341/67 |
| 5,479,166 A | * | 12/1995 | Read et al. .................... 341/65 |
| 5,491,828 A | * | 2/1996 | Intrater et al. ................ 712/35 |
| 5,512,893 A | * | 4/1996 | Gulick ......................... 341/26 |
| 5,525,985 A | * | 6/1996 | Schlotterer et al. ......... 341/136 |
| 5,585,802 A | * | 12/1996 | Cabler et al. ............... 341/143 |
| 5,751,234 A | * | 5/1998 | Schlotterer et al. ......... 341/139 |
| 6,119,213 A | * | 9/2000 | Robbins ..................... 711/202 |
| 6,408,382 B1 | * | 6/2002 | Pechanek et al. ............. 341/55 |
| 6,501,479 B1 | * | 12/2002 | Root et al. .................... 341/67 |

* cited by examiner

Primary Examiner—Michael Tokar
Assistant Examiner—Lam T Mai
(74) Attorney, Agent, or Firm—Thomas, Kayden, Horstemeyer & Risley

(57) ABSTRACT

Methods and systems for processing data are disclosed. An exemplary system for parsing and modifying data stored in an array of storage elements includes a parsing system configured to access the data stored in selected storage elements of the array of storage elements and output the data in one of a plurality of register formats and a write system configured to write data to selected storage elements of the array of storage elements, wherein the data is received in one of the plurality of register formats. The plurality of register formats includes a first set of register formats corresponding to a packed representation of the data and a second set of register formats corresponding to an unpacked representation of the data.

50 Claims, 13 Drawing Sheets

SYSTEM AND METHOD FOR PROCESSING DATA

CROSS-REFERENCE TO RELATED APPLICATION

This application claims the benefit of U.S. Provisional Application, Ser. No. 60/300,966, filed on Jun. 26, 2001 and entitled "Bit Packing and Unpacking Method," which is incorporated by reference herein in its entirety.

FIELD OF THE INVENTION

The present invention generally relates to data processing with microprocessors. More specifically, the invention relates to processing data located in an array of storage elements.

BACKGROUND OF THE INVENTION

Packet-based switching has been the focus of many telecommunication providers and manufacturers for some years now (ATM is a form of packet switching as used herein). At each network point in a packet-switched network, the communicated data may be processed for several reasons, such as error handling, traffic management, routing, etc. Generally, each packet, or Protocol Data Unit (PDU), may include some overhead, typically present in header and trailer fields, along with the relevant communicated data in a payload. The header of the PDU may include the appropriate information that a network point may need to perform the various functions listed above.

As the quest for speed continues to drive the networking and telecommunication industries, the equipment at the network points is expected to perform at faster speeds. For these reasons, hardware vendors are turning to network processors (also called communications processors) to support increasingly complex tasks at wire speeds. Programmable network processors can provide system flexibility while delivering the high-performance hardware functions required to process the PDUs at wire speed.

Generally, network processors perform four general tasks: parse, search, resolve, and modify. Network-specific processors strive to optimize each of these tasks to boost the processing performance. FIG. 1 illustrates a method 10 for processing data at a network point, such as at a packet switch, that is generally well known in the art. The first step 1 is to receive the data at the physical layer. Generally, this step may require the data to be converted from analog to digital, if necessary. Next, the digital data may be buffered into a temporary storage location (step 2). Typically, the buffer will be a Random Access Memory (RAM), or a register. In general, though, the buffer may be some type of fast memory location. Once buffered, the network processor can begin working on the data.

The first step generally performed by the network processor is to parse the PDU (step 3). In essence, parsing involves analyzing and classifying the contents of the PDU and its fields. Once parsed, appropriate fields of the PDU may be used to search tables for matches (step 4). The tables may be routing tables that dictate the next destination for the packet. Just prior to, or just after searching, error handling may be performed, commonly with a cyclic redundancy check (CRC), to verify if the PDU is valid. The next step is to resolve the destination and Quality of Service (QoS) requirements (step 5). Certain packets may be given certain priority, re-routing information may need to be determined and communicated, etc. When necessary, the PDU may be modified and/or updated with the appropriate routing information (step 6). Once the PDU has been updated, the packet may be sent to its next destination through the network (step 7).

In terms of speed, processors are typically measured by the number of clock cycles necessary to perform a particular task combined with their clock frequency. For embedded applications, the energy efficiency is also an important performance parameter. Several algorithms are known in the art that perform the parsing and modifying of the PDU's. Each algorithm varies in complexity as well as performance, e.g. required clock cycles. For example, a relatively straight-forward approach to parsing can be performed in software with a higher level programming language such as C. A simple record structure that is made up of several fields may be used to represent a PDU. Each field of the PDU record may be directly addressed which allows for easy access and manipulation of the fields. Unfortunately, while not complex, the programmer can not model the method in which the data is accessed in memory. Quite often, many wasteful clock cycles are used when a software approach is utilized, which leads to poor performance.

Other software solutions can utilize manual bit-level operations. A well known scheme that is often utilized by general purpose processors is a shift and mask operation. In general, to access a field located in a PDU, the field may need to be shifted so that the least-significant-bit (lsb) of the field is the lsb of the current register. The other remaining, unimportant bits in the register, can then be masked out. This, although typically more efficient than the previous solution, can still be quite cumbersome.

Hardware solutions have also been created to parse and modify a given PDU. Most of these solutions simply mirror the software implementations above. Other solutions simply consist of hardwired state machines.

Therefore, there exists a need for improved systems and methods for processing data that is stored in a packed structure, such as a PDU. It would be desirable for this solution to require as little clock cycles as necessary, but still allow for flexibility in design and implementation.

SUMMARY OF THE INVENTION

The present invention relates to methods and systems for processing data, particularly data of a packed data structure, such as a PDU. In this regard, an embodiment of a system for parsing data stored in an array of storage elements includes a decoder configured to receive a desired register format from a plurality of register formats and further configured to activate an enable signal from a set of enable signals based on the desired register format. The system also includes operational logic configured to derive an array of output data bits related to the desired register format. The operational logic receives as inputs the set of enable signals and selectively connected storage elements of the array of storage elements.

In another embodiment, a system for writing data to an array of storage elements includes a decoder configured to receive a desired register format from a plurality of register formats and further configured to activate an enable signal from a set of enable signals based on the desired register format. The system also includes an array of bit-selector blocks configured to write the data to the array of storage elements in the desired register format. Each bit-selector block receives as inputs various selected bits of the data and selected enable signals of the set of enable signals, such that activation of one of the selected enable signals dictates which bit of the various input bits is to be written to a particular storage element.

Another embodiment may be construed as a system for parsing and modifying data stored in an array of storage elements. This system includes a read decoder configured to receive a desired register format from a plurality of register formats and further configured to activate a read-enable signal from a set of read-enable signals based on the desired register format. The system also includes operational logic configured to derive an array of output data bits related to the desired register format, wherein the operational logic receives as inputs the set of read-enable signals and selectively connected storage elements of the array of storage elements. The system further includes a write decoder configured to receive a desired register format from the plurality of register formats and further configured to activate a write-enable signal from a set of write-enable signals based on the desired register format and an array of bit-selector blocks configured to write the data to the array of storage elements in the desired register format. Each bit-selector block receives as inputs various selected bits of the data and selected write-enable signals of the set of write-enable signals, such that activation of one of the selected write-enable signals dictates which bit of the various input bits is to be written to a particular storage element.

Another embodiment may be construed as a system for parsing data stored in an array of storage elements. The system includes a Read Programmable Table (RPT) preprogrammed with bit-level mapping information related to the array of storage elements and a read selector block coupled to the RPT and configured to, when enabled, read and output contents of appropriately selected storage elements of the array of storage elements based upon the bit-level mapping information provided by the RPT.

Yet another embodiment may be construed as a system for writing data to an array of storage elements. The system includes a Write Programmable Table (WPT) preprogrammed with bit-level mapping information related to the array of storage elements and a write selector block coupled to the WPT and configured to, when enabled, write selected bits of the data to particular storage elements of the array of storage elements based upon the bit-level mapping information provided by the WPT.

In another embodiment, a system for parsing and modifying data stored in an array of storage elements includes a parsing system configured to access the data stored in selected storage elements of the array of storage elements and output the data in one of a plurality of register formats and a write system configured to write data to selected storage elements of the array of storage elements, wherein the data is received in one of the plurality of register formats. The plurality of register formats includes a first set of register formats corresponding to a packed representation of the data and a second set of register formats corresponding to an unpacked representation of the data.

Another embodiment may be construed as a system for parsing and modifying data stored in an array of storage elements This system includes means for receiving a desired parsing format of a plurality of register formats, wherein the data is to be output in the desired parsing format, means for determining which storage element is to be accessed for each bit of the desired parsing format; and means for outputting the data in the desired parsing format. The plurality of register formats includes a first set of register formats corresponding to a packed representation of the data and a second set of register formats corresponding to an unpacked representation of the data.

In another embodiment, a representative method for parsing and modifying data stored in an array of storage elements includes: receiving a desired parsing format of a plurality of register formats, wherein the data is to be output in the desired parsing format; determining which storage element is to be accessed for each bit of the desired parsing format; and outputting the data in the desired parsing format. The plurality of register formats includes a first set of register formats corresponding to a packed representation of the data and a second set of register formats corresponding to an unpacked representation of the data.

Other systems, methods, features, and advantages of the present invention will become more apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The present invention will be more fully understood from the detailed description given below and from the accompanying drawings of the preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION

A simple example of an implementation has been included for the purposes of more easily describing the present invention. The included example refers to an Asynchronous Transfer Mode (ATM) cell as the Protocol Data Unit (PDU), and the header of the cell will be the example used to describe the implementation. To further simplify the example, a 16-bit data width has been utilized, although today more and more processors are operating with a 32 or 64-bit data width. It should be understood, that although this is the only example thoroughly disclosed, many other protocols other than ATM could utilize the present invention. A non-limiting list of packet-based communication protocols that may utilize the present invention includes: Internet Protocol (IP), Frame Relay, Transmission Control Protocol (TCP), and User Datagram Protocol (UDP). Likewise, the implementation of the present invention may vary with the configuration of the processor at hand. Variations of the present invention may, and most likely will, deviate from the example disclosed herein for the purposes of complying with the intended processor.

Figure 2:
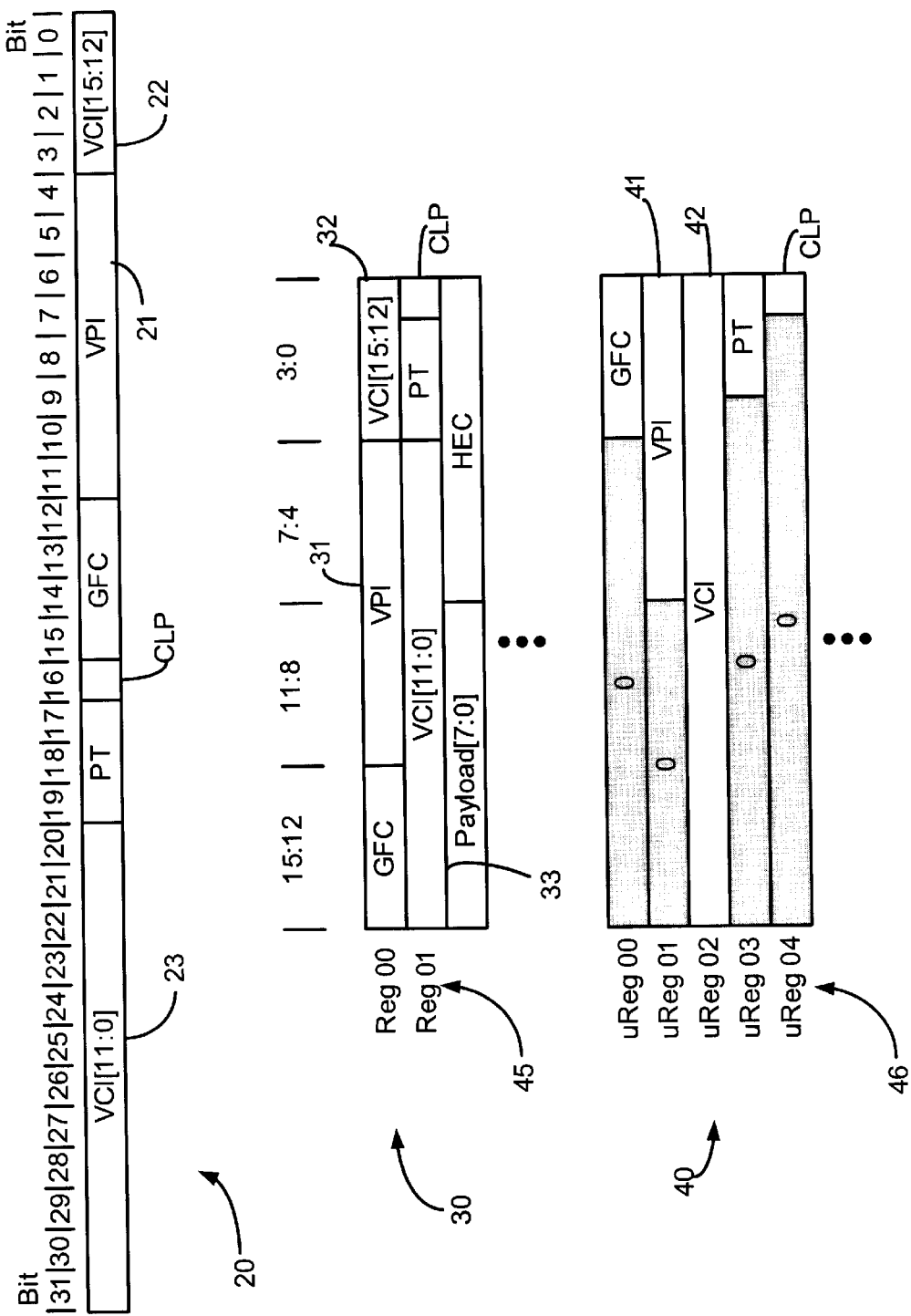
FIG. 2 is a schematic illustrating several different views of data stored in a PDU in accordance with embodiments of the present invention.

Turning now to the drawings illustrating the present invention, wherein like reference numerals designate corresponding parts throughout the drawings, FIG. 2 is a schematic illustrating several different views of data stored in an ATM PDU in accordance with embodiments of the present invention. The classical representation of an ATM PDU, or more often called an ATM cell, is 53 octets or bytes, stacked vertically. The first five bytes of the PDU is considered the header and the remaining portion of the PDU is considered the payload. In contrast to ATM which utilizes a fixed size PDU, other protocols utilize a variable length PDU with a header, payload, and tail, to signify the end of the PDU. In general, PDUs contain bits of data that are organized and packed in such a way that a receiver can properly interpret various fields from the data.

A packed view 30 of an ATM header includes 5 bytes of overhead. For the purposes of this discussion, the first four bytes, or 2 16-bit words will be discussed. The packed view 30, as in the other views to be discussed, displays several fields that convey certain relevant information. Although the relevant information conveyed is not pertinent to the discussion at hand, a general description of a couple of the fields will be discussed. An eight-bit field, a Virtual Path Identifier (VPI) 31 is used in conjunction with the Virtual Channel Identifier (VCI) 32 and 33 to identify the next destination of a cell as it passes through a series of ATM switches on the way to its destination. The VCI 32 and 33 is straddled over two register addresses. The four most significant bits (msb) of the VCI (32) may be addressed through Reg 00, whereas the 12 least significant bits (lsb) of the VCI (33) may be addressed through Reg 01. Prior art methods would require several clock cycles to parse the data stored in the VPI 31. For example, upon utilizing a shift-and-mask algorithm, the entire 16-bit register would be retrieved. Then, the four lsb of the 16-bit register would be eliminated as the remaining contents (which includes the desired VPI 31) is shifted down until the lsb of the VPI 31 is the lsb of the register. This step alone may require four clock cycles. Next, the bits representing the VPI 31 would be masked with some type of logic as the remaining portion (the eight msb) would be written to a binary 0. This may require two more clock cycles. Once this is complete, the VPI 31 is the only data currently in the register, and so is ready to be utilized.

In order to parse the VCI 32 and 33, several mores clock steps must be made because the VCI 32 and 33 is straddled across two registers. Therefore, the shift-and-mask routine must be performed twice, and the results combined into a single register.

The packed view 30 illustrates the space efficiency of a packed data structure, but also illustrates the time inefficiency of accessing the data stored in the structure. Unfortunately, most, if not all, data that is communicated using a packet-switch protocol is communicated in a packed structure.

The packed view 30 collectively contains a first set of register formats 45 in which each register format 45 defines a format in which the stored data may be addressed at the bit-level. The first set of register formats 45, those of the packed view 30, may address the data so that each bit of a particular packed register format 45 is utilized. More than one field of a given PDU may be accessed by utilizing a particular packed register format 45. This packed view 30, generally attempts to address the data in the same format as it was received in a bit stream. Accessing the stored data through one of the packed register formats 45 may be useful when writing the data to external memory, possibly as a background operation by a direct memory access (DMA).

An unpacked view 40 illustrates another addressing interpretation of the same data. In the unpacked view 40, each field that is stored in the 32 bits of the ATM header it allotted its own unpacked register format 46. The VPI 41 of the unpacked view 40, for example, has its lsb as the lsb of uReg 01, as if the shift-and-mask operation were already performed. The VCI 42 utilizes the entire contents of uReg 02 and need not be separated about two register formats. Although more register formats 46 are used, less time is needed to access a desired field. The unpacked view 40 is better suited for processor manipulation of the data.

A stored-bit array 20 displays a one-dimensional interpretation of the same data that may be addressed via one of the register formats 45 or 46, previously discussed in relation to the packed and unpacked views 30 and 40, respectively. Generally, an array of storage elements, such as flip-flops may store the data bits of the bit array 20 and may be accessed by one of the register formats, such as Reg 00 or uReg 02. For example, theg msb of the VCI 22 is bit 3 of the stored-bit array 20. Bit 3 of the stored-bit array 20 may be accessed by addressing bit 3 of Reg 00 of the packed view 30 and/or bit 15 of uReg 02 of the unpacked view 40. Likewise, writing to bit 15 of uReg 02 or bit 3 of Reg 00, simply implies writing to bit 3 of the stored-bit array 20.

It should be noted that, for this example, the 32 bits are stored in one location, an array of storage elements. The packed view 30 and the unpacked view 40 provide for alternative formats in which the stored data may be addressed. Dual addressing schemes allow for access to and from the same stored bit in two different ways. It should be noted, that more than two views may exist for the same data. For example, an ATM PDU may be a User-Network Interface (UNI) PDU, which is the case described here, or it may be a Network Node Interface (NNI) PDU, which eliminates the GFC field, and the VPI is extended four more bits. So for ATM applications, three different views may exist. More register formats may be provided for more views of the data.

Figure 1:
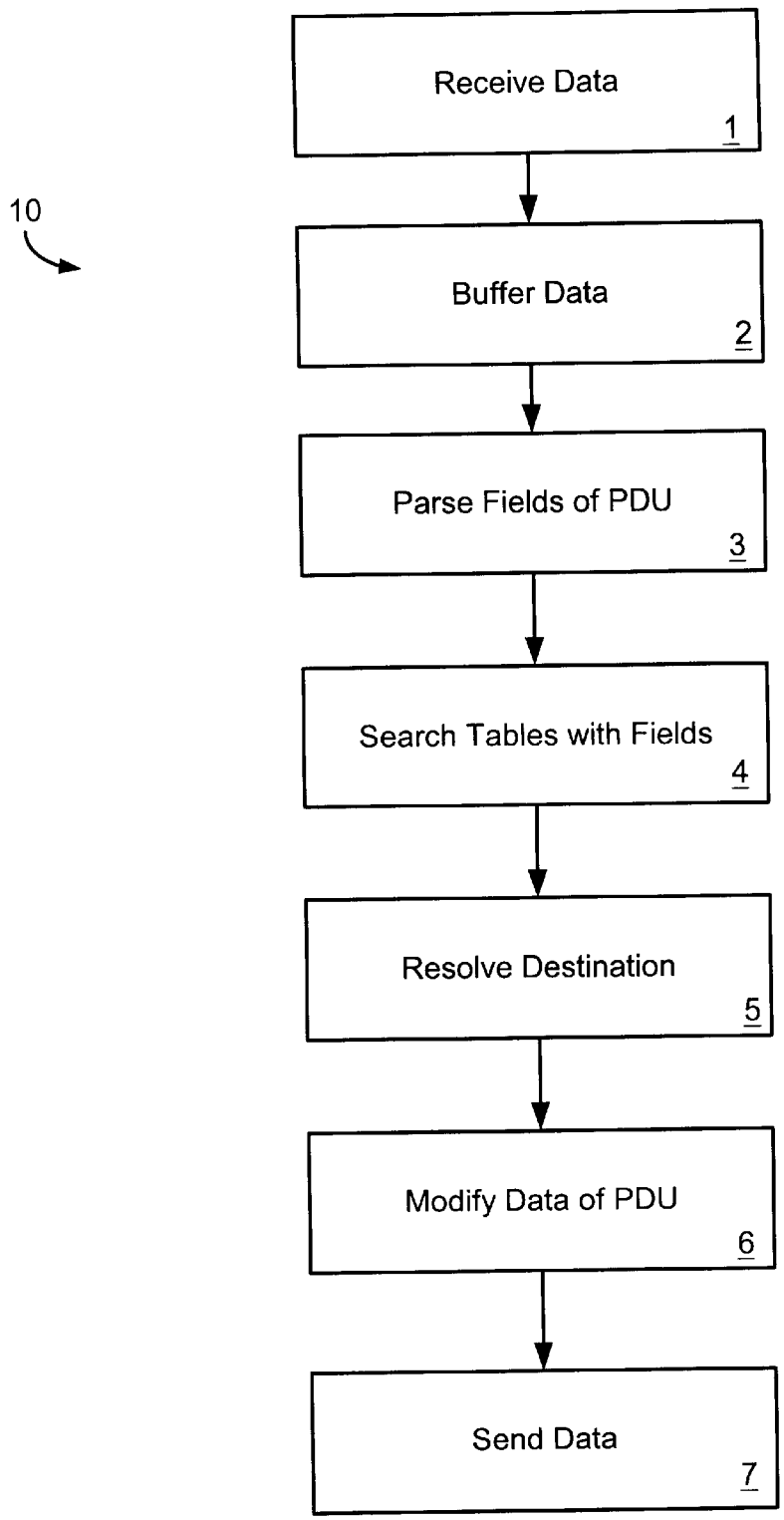
FIG. 1 is a flow chart illustrating a prior art method for processing data at a network point, such as at a packet switch.
Figure 3:
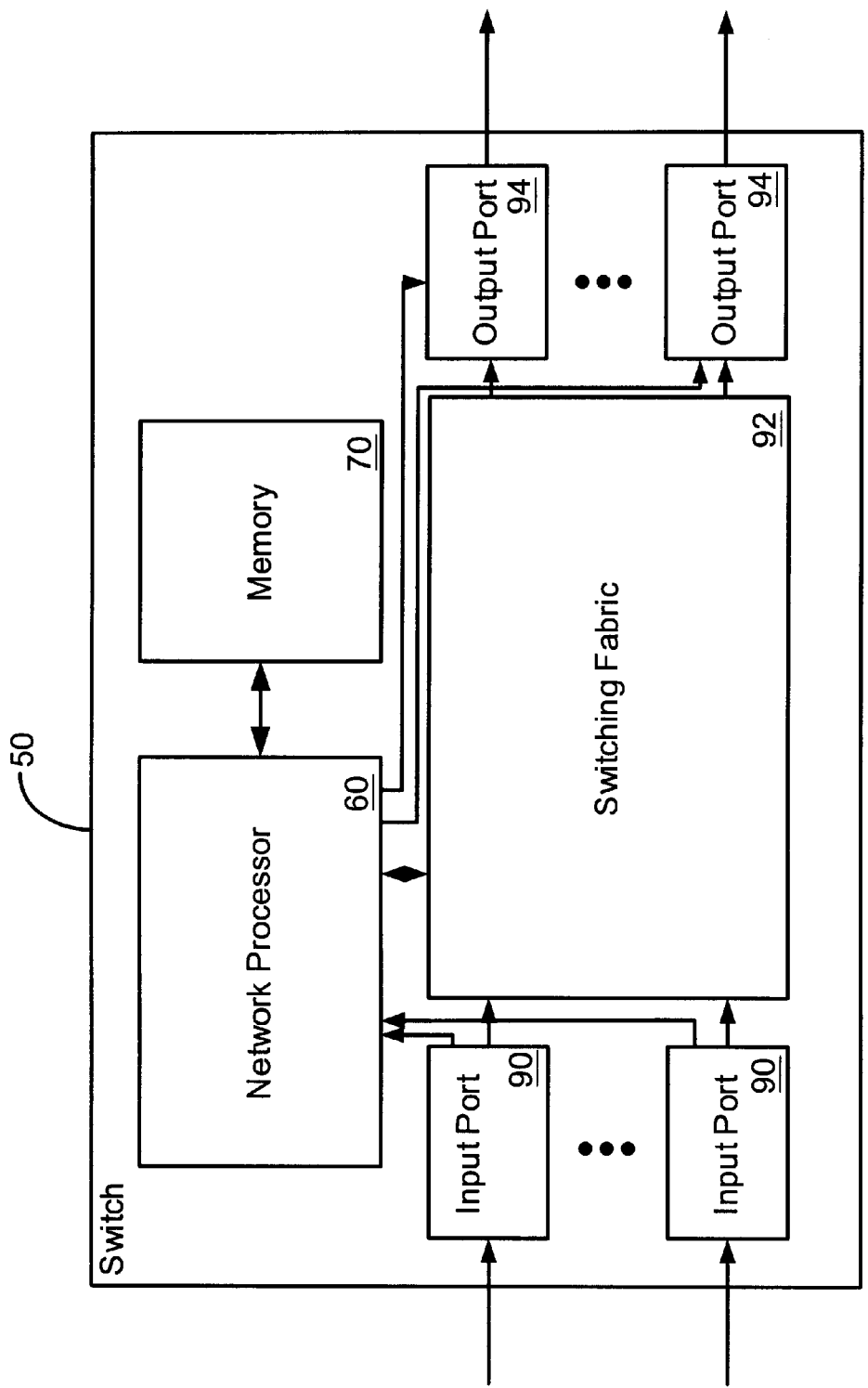
FIG. 3 is a block diagram illustrating a packet switch similar to that discussed in relation to FIG. 1.

FIG. 3 is a block diagram illustrating a packet switch 50 similar to that discussed in relation to FIG. 1. The particular example illustrated, and in relation to the continued example, is an ATM switch, or cross-connect. The main function of an ATM switch is to relay user data cells from input to the appropriate output. The information within the PDU payloads is carried transparently by the ATM network, and therefore the switch may process only the PDU headers. The headers are processed when the cells are received at the input ports 90 of the switch 50. The VPI/VCI information (See FIG. 2) parsed from the PDU headers is used to route the PDUs through the switch 50 to the appropriate output ports 94. The PDUs are prepared for physical-layer transmission at the switch output ports 94. In the broadest sense, the input and output ports 90 and 94 provide an interconnection for the switch 50 to users, other switches, and other network elements. In addition to the input and output ports 90 and 94, the switch 50 may have other interfaces (not shown) for exchanging control and management information with special-purposes networks such as the intelligent network and the telecommunications management network.

The inputs ports 90 may be directly coupled to a switching fabric 92. The switching fabric 92, generally, will perform the routing of the data from input to proper output. The switching fabric 92 may be directly coupled with the output ports 94.

A network processor 60 may be coupled to the input ports 90, the switching fabric 92, and the output ports 94 either directly or through some type of local interface, such as a bus. Memory 70 local to the switch 50 may be coupled to the network processor 60, as well, to store data logs and other information.

Several input ports 90 may exist within a single switch 50, as generally, each incoming physical line would require an input port 90. The first function of the input port 90 is termination of the incoming signal and extraction of the ATM PDU stream. Basically, this involves conversion of the signal into a digital and electrical signal (the incoming signal may be analog and/or optical). The ATM data may then be buffered into temporary storage. Once buffered, the network processor 60 may then proceed with processing the ATM data.

Once the network processor 60, determines the proper routing information, the switching fabric 92 can then be properly configured by the network processor 60 to transfer the PDUs. In general the switching fabric 92 is primarily responsible for transferring PDUs between the other functional blocks in the switch 50. The switching fabric 92 is made up of several switches that may guide data from one input port 90 to a particular output port 94 based on the VPI/VCI of the PDU.

In general, the output ports 94 perform many of the reverse functions of the input ports 90. Fields in the header of each PDU may be updated with appropriate error handling information as well as routing information for the next network element. The ATM data may then be configured appropriately for the utilized physical layer, which may require conversion back to analog or optical.

The network processor 60 is preferably a hardware device for executing software or firmware, particularly that stored in memory 70. The processor 60 can be any custom made or commercially available processor, a central processing unit (CPU), a semiconductor based microprocessor (in the form of a microchip or chip set), a macro processor, or generally a device for executing software instructions. More than likely, however, the network processor 60 will be specifically designed to provide system flexibility while delivering high-performance hardware functions required to process PDUs at wire speed. The network processor 60 may be a programmable integrated circuit (IC) based on system-on-a-chip technology that perform communications-specific functions more efficiently than general-purpose processors. The network processor 60 generally will have a reduced instruction set computer (RISC) based architecture, but may be somewhat augmented with hardware accelerators. Typically the network processor 60 will have extensive DMA features to move large amounts of data, extensive support for bit level operations to perform parsing functions, and HW accelerators supporting error control codes like CRC. The network processor 60 may perform other specialized functions to support tasks commonly found in communications processing like leaky bucket operations for bandwidth control.

The memory 70 can include any one or combination of volatile memory elements (e.g., random access memory (RAM, such as DRAM, SRAM, SDRAM, etc.)) and nonvolatile memory elements (mostly NVRAM and PROM variants for embedded systems, possibly even bulk storage, e.g., hard disk drive, tape, CDROM, etc.). Moreover, the memory 70 may incorporate electronic, magnetic, optical, and/or other types of storage media. Note that the memory 70 can have a distributed architecture, where various components are situated remote from one another, but can be accessed by the processor 60.

As will be discussed hereinafter, embodiments of the present invention may be located in the network processor 60. Although the network processor 60 is the preferred implementation, other microprocessors may house embodiments of the present invention, likewise, embodiments of the present invention should not be limited to implementations within network processors. To that, although the ATM switch 50 is the only network element specifically discussed in the present application, certainly embodiments of the present invention may be located in other network elements, such as endpoints and central office equipment. Likewise, protocols, other than ATM, as mentioned earlier, may utilize embodiments of the present invention.

Figure 4:
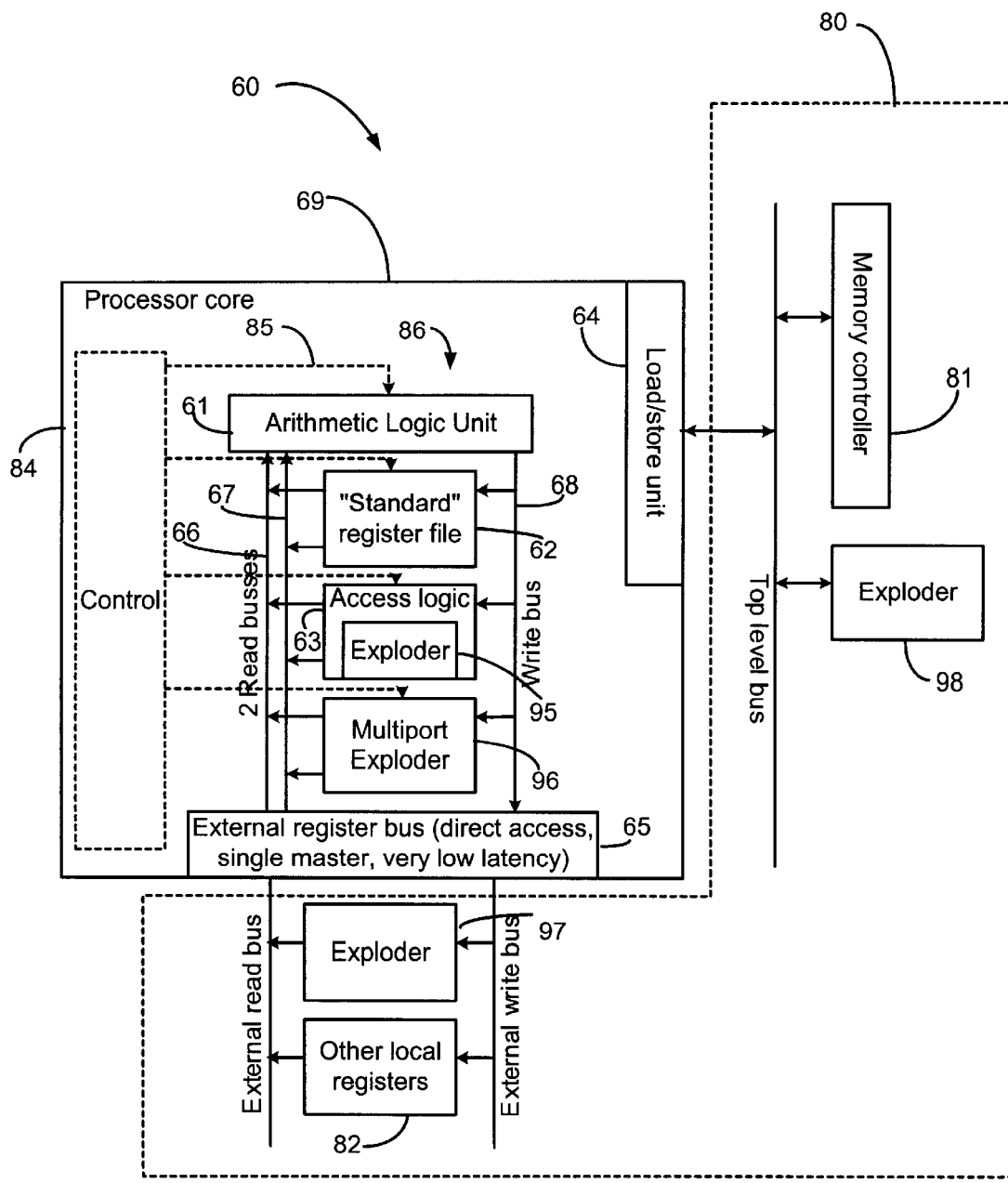
FIG. 4 is a block diagram illustrating the network processor of the packet switch of FIG. 3.

FIG. 4 is a block diagram illustrating the network processor 60 of the packet switch 50 of FIG. 3. The network processor 60 is generally comprised of a processor core 69 and local memory 80. The processor core 69 generally is broken up into control and computation. A control unit 84, generally, controls the operation of a datapath 86, which may handle all of the computation and processing of data.

FIG. 4 illustrates several different embodiments of an exploder function block 95, 96, 97, and 98, each differing in location in the processor 60 as well as in performance levels. In general, however, each exploder function block 95, 96, 97, and 98 will include an embodiment of a parsing and modifying data system 100, which will be discussed in subsequent figures. This figure aims to illustrate the location of the system 100 within a network processor 60 and the relationship with other components within the processor 60.

The datapath 86 may consist, generally, of execution units, such as an arithmetic logic unit (ALU) 86 and register files 62. The exploder function blocks 95 and 96 may be considered register files with added functionality and control of the data stored in the register file. Although not shown, the datapath 86 may also include other registers that are needed to process instructions, maintain a program counter, and other utility operations. Also included in the datapath 86 are the communication links between the different components. In this illustration, a write bus 68 and two read busses 66 and 67 communicate data between the ALU 86 and the register file 62 and the exploder function blocks 95 and 96. In some embodiments, the write bus 68 and the read busses 66 and 67 may also carry data, control, and addressing information to the register file 62 and the exploder function blocks 95 and 96. In other embodiments, the control unit 84 may provide the addressing information to these blocks through control lines 85.

In RISC architecture, the number of input and output ports of the register files generally correlates to the number of operands the ALU 61 is capable of processing. In this embodiment, a standard three operand ALU 61 is utilized with two sources and one destination, thus taking on a 2Read+1Write (2R+1W) structure. The three busses 66, 67, 68 provide such information. In general, the ALU 61 can perform standard RISC operations on the operands received, such as: add, subtract, shift, etc.

The standard register file 62 typically contains very fast registers used to store temporary memory. The standard register file 62, as in any other register file of the datapath 86 may receive an address and a command to read data from that address or write data to the received address.

The multiport exploder function block 96 may be configured for the 2R+1W structure. In this embodiment, the system 100 may be configured such that two read and one write ports are available. The main advantage of the multiport exploder function block 96 is that three address ports may be provided and so two read and one write commands may be performed simultaneously on three independent addresses.

The single port exploder function block 95 may receive only one address and so can either perform one read or write operation in one clock cycle. An access logic block 63 may be wrapped around the single port exploder function block 95 so that only one concurrent access is present and may multiplex the three ports (2R+1W) to the one port present.

The control unit 84 may fetch an instruction from memory 80. The control unit 84 may decode the instruction and access a register file. The accessed data may be provided to the ALU 61 for further operation. An instruction may also be given to write data to a register file. In which case, the data may be provided through the write bus 68. As mentioned earlier, the address information may be provided via the write and read busses 66, 67, and 68, or through control lines 85 provided by the control unit 84, depending on the configuration of the processor 60.

In other embodiments, an exploder function block 97 may be located in such a way that it may be indirectly coupled to the ALU 61 via a local coprocessor/register bus 65. In yet other embodiments, an exploder function block 98 may be located on a top level bus as a memory mapped peripheral and may be accessed via a lod/store unit 64. These embodiments of the exploder function block 97 and 98 typically require less implementation complexity because of less stringent timing constraints. The tradeoff may come in their performance because of increased latency. The exploder function block 98 has the additional advantage of allowing multiple embedded processors access the same exploder function block 98 as a shared resource if desired.

Figure 5:
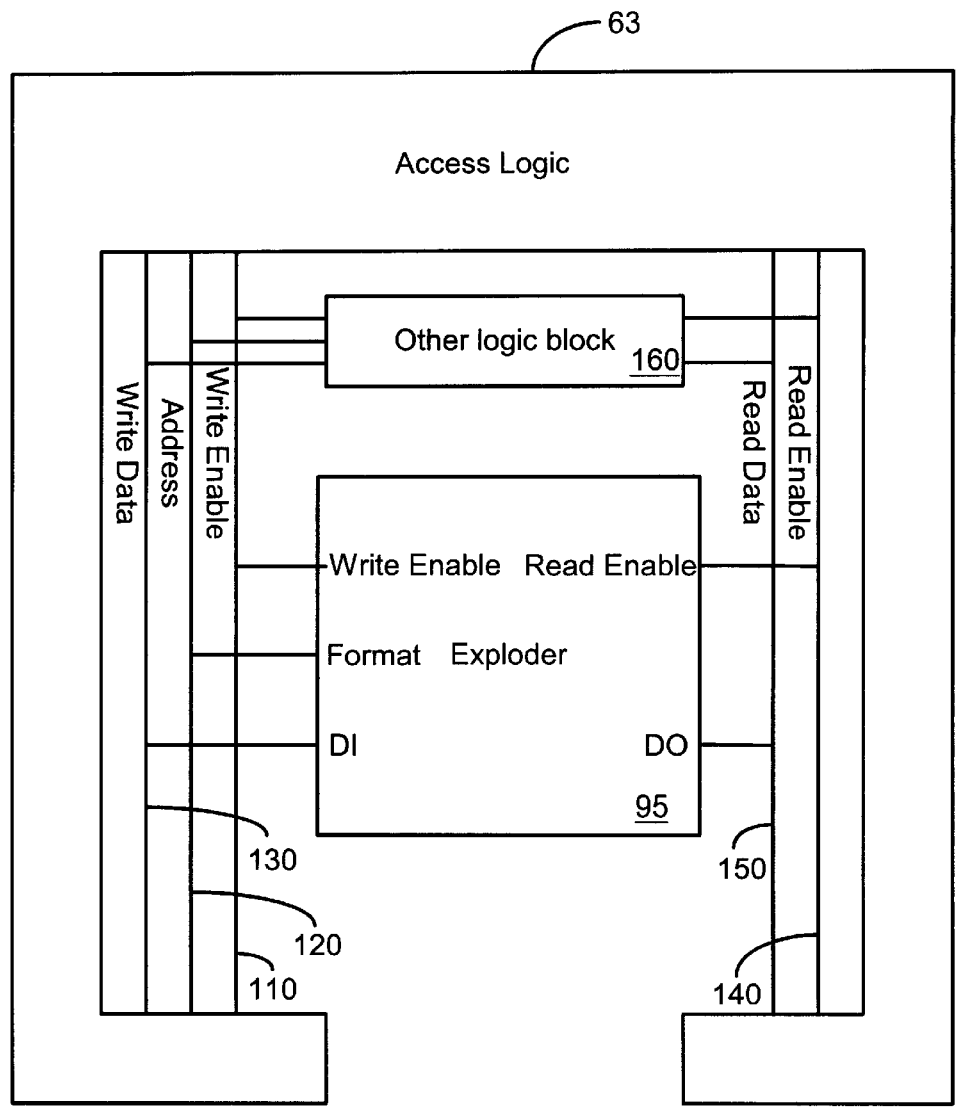
FIG. 5 is a block diagram further illustrating an embodiment of an exploder function block of FIG. 4.

As discussed in relation to the previous figure, embodiments of the parsing and modifying data system 95 may be included in different embodiments of an exploder function block, which for simplicity sake, may be considered a register file with added functionality. FIG. 5 aims to illustrate one embodiment of an exploder function block, the single port exploder function block 95. As mentioned earlier, the single port exploder function block 95 may be coupled to an access logic block 63 that may be configured to allow only one concurrent access to block 95 from the three busses (2R+1W) 66, 67, and 68. This may accomplished by multiplexing the addressing carried along the three busses 66, 67, and 68 to the one address port of the exploder function block 95 via a single address bus 120. In subsequent figures, the information provided along the address bus is the address or desired register format 120 in which the data is to be retrieved or written to. In the classical sense, the information provided by accessing a register file with this information would be the register contents at this address. In relation to the present application, the contents of a storage element, perhaps a register are provided in the desired register format 120 which is one of the sets of register formats 45 and 46 discussed in FIG. 2. Each register format 45 and 46 may be considered a different address, although distinct physical locations do not correlate to different addresses.

A write enable signal 110 may be provided to the exploder function block 95 to enable a write command, as well as a read enable signal 140 to enable a read command. These signals may be parsed out from the read and write busses 66, 67, and 68 by the access logic 63 or may be parsed out by the exploder function block 95 itself. Also connected to the exploder function block 95 is write data, or a data in (DI) bus 130 which may provide the data to be written to the function block 95. Typically, this data may be provided by the ALU 61 via the write bus 68. A data out (DO) bus 150 is connected to the exploder function block 95 as well, providing for a path to the ALU 61 for the retrieved data in the exploder function block 95.

Figure 6:
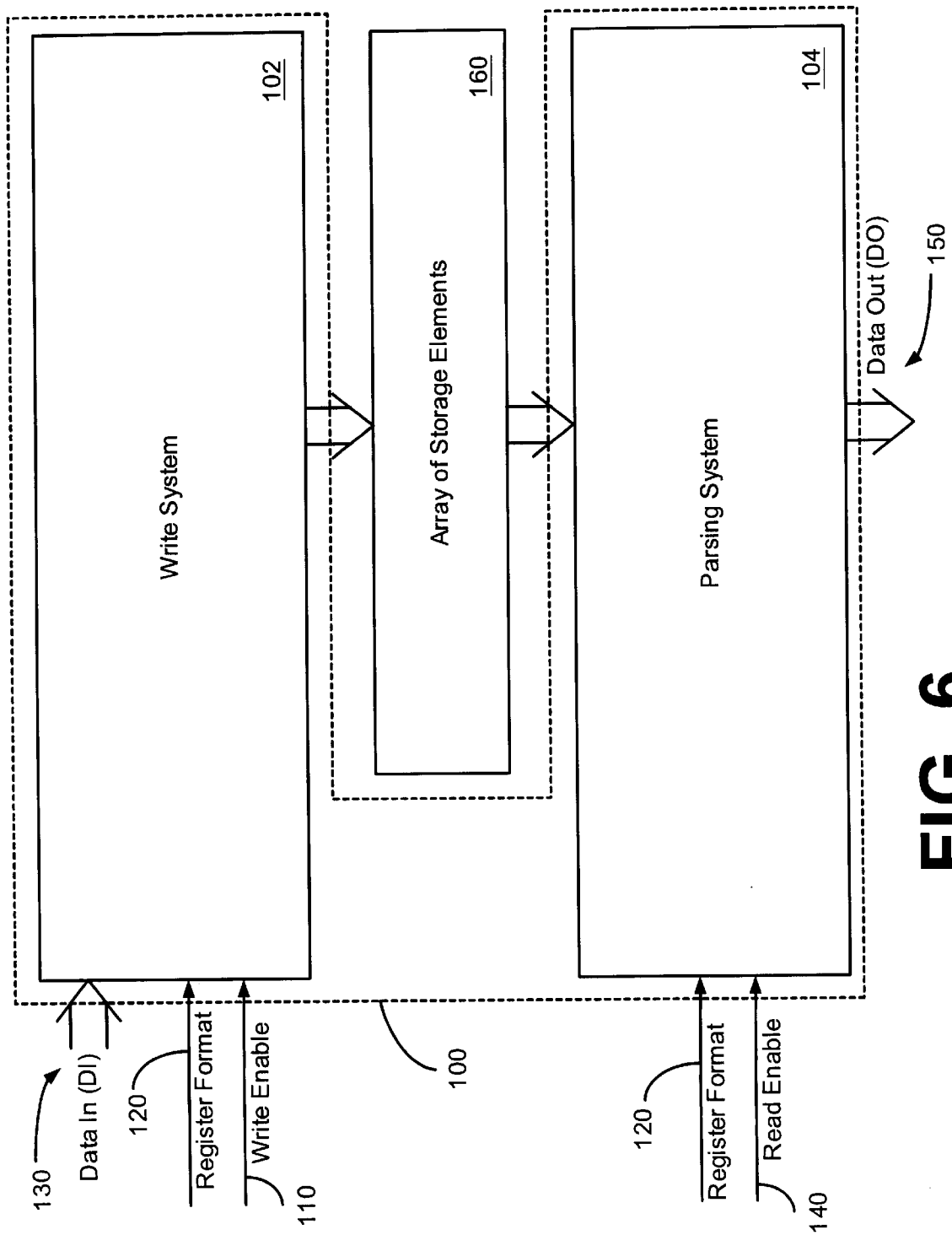
FIG. 6 is a schematic illustrating a parsing and modifying data system in accordance with the present invention.

FIG. 6 is a schematic illustrating a parsing and modifying data system 100 in accordance with the present invention. This embodiment may be found inside the single-port exploder unit 95, although the present embodiment may be configured to be implemented in the multi-port exploder unit 96, as well as the other exploder function blocks 97 and 98. The system 100 is configured to read data from and write data to an array of storage elements 160 in one of a plurality of register formats 45 and 46 that correspond to the packed view 30 and the unpacked view 40 of the data. The various register formats 45 and 46 provide for alternative register formats of the same data, which may be useful for processing the data by other components of the network processor 60 (See FIG. 4) such as the ALU 61.

The system 100 includes a write system 102 that is configured to write input data to the array of storage elements 160 in a desired register format 120. The system 100 also includes a parsing system 104 that is configured to read data from the array of storage elements 160 and output the data in a desired register format 120.

The system 100 receives as an input, the desired register format 120, which is one of the plurality of register formats 45 and 46. The desired register format 120 may be provided to both the write system 102 and the parsing system 104. A Write Enable signal 110 is provided to the write system 102 to enable the writing of input data that is provided by the DI bus 130. If the Write Enable signal 110 is active, the write system 102 may write the data on the DI bus 130 to the array of storage elements 160 in the desired register format 120.

A Read Enable signal 140 may be provided to the parsing system 104 to enable the accessing of the array of storage elements 160. If the Read Enable signal 140 is active, the parsing system 104 may access the appropriate storage elements of the array 160 and output the data on the DO bus 150 according to the desired register format 120.

The array of storage elements 160 may be located local to the system 100 or may be remotely located, and so in one embodiment, the array of storage elements 160 may be included in the system 100 and in another embodiment, may be separate from the system 100.

Figure 7:
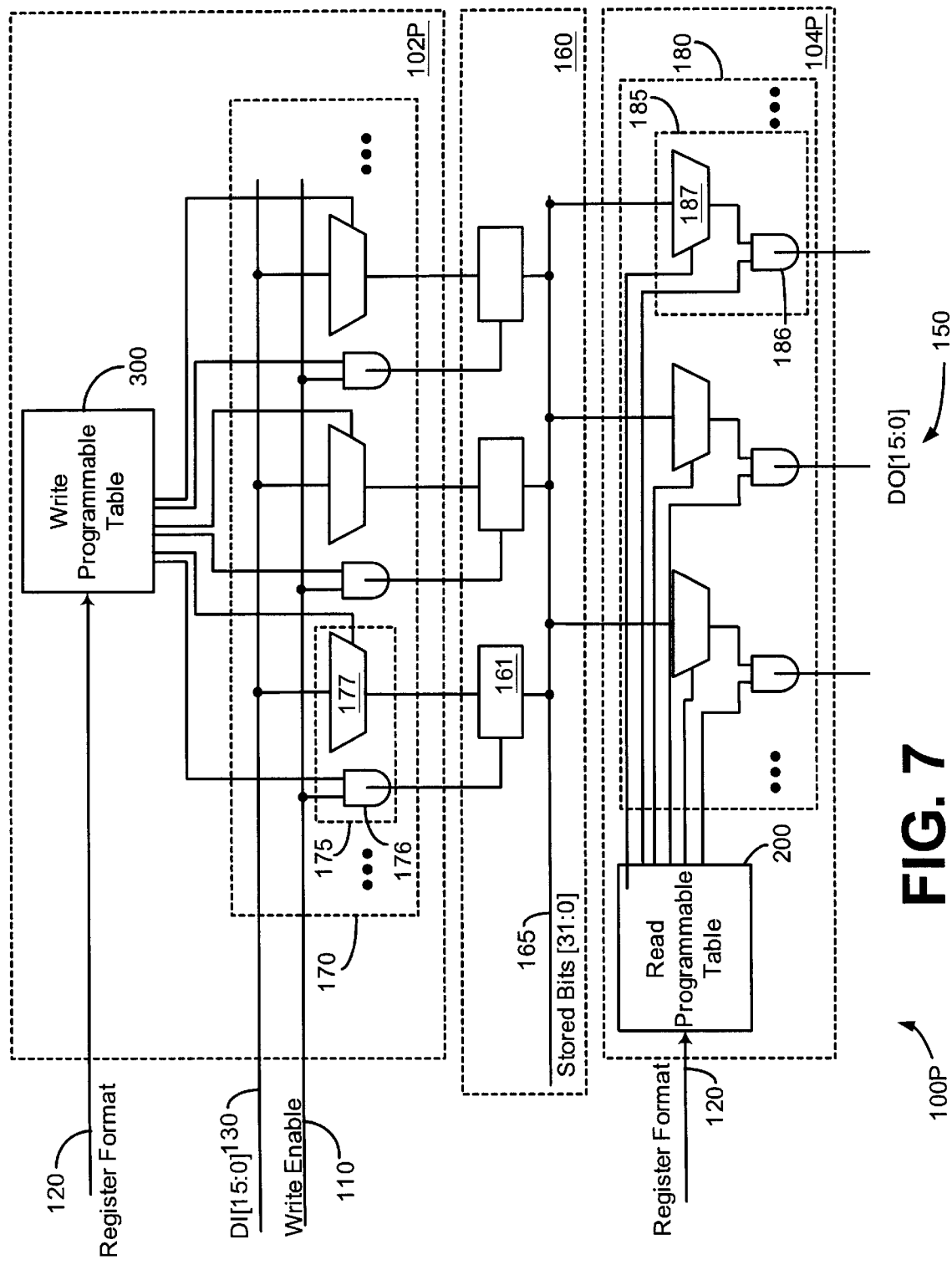
FIG. 7 is a schematic illustrating an embodiment of a programmable implementation of the parsing and modifying system of FIG. 6.

FIG. 7 is a schematic illustrating an embodiment of a programmable implementation of a system I 100P for parsing and modifying data in a packed data structure in accordance with the present invention. The system 100P interacts, at its core, with an array of storage elements 160. In this example, the array 160 contains 32 elements all coupled to a "Stored Bits" bus 165. In the preferred embodiment, the array of storage elements 160 may be considered an array of flip-flops, or more generally, any type of storage element, such as a register or memory element. Above the array of storage elements 160 is, generally, the write system 102P, and below is the parsing system 104P. In general, the write system 102P may perform the modifying of the data, whereas the parsing system 104P may, obviously, perform the parsing of the data.

First, the parsing system 104P will be discussed. The parsing system 104P includes a Read Programmable table 200 configured to produce several control lines that are mapped to a read selector block 180. The read selector block 180 comprises an array of bit-selector blocks 185. In this example, 16 bit-selector blocks 185 are included in the system 104P to output the 16 bits to be placed on the DO bus 150. Each bit-selector block 185 may include the hardware to select the specific storage element 161 in the array 160 from which to retrieve data. Generally, a multiplexer 187 and a simple AND gate 186 may be used to perform this functionality. The multiplexer 187 may receive, as a select line from the Read Programmable Table 200, a signal selecting which bit from the Stored Bits bus 165 to select. In general, the multiplexer 187 may be an N to 1 multiplexer, where N is the number of storage elements 161 in the array 160. The AND gate 186 receives an enable or valid signal from the Read Programmable Table 200, which may determine whether to default to a data 0 as the output of the bit-selector block 185 or utilize the output of the multiplexer 187.

In practice, the Read Programmable Table 200 may receive as an input a desired register format 120, which may be any register format 45 or 46 as discussed in relation to the packed view 30 and the unpacked view 40 of FIG. 2. The output of the system 104P is a 16-bit array of the data which is placed on the DO bus 150, which is in the desired register format 120. The system 104P is capable of delivering the data in the desired register format 120 in one clock cycle, plus any delay in the operation logic of the read selector block 180, which is typically minimal. To that, the output of the system 104P, may already be configured in such a way, that the ALU 61 need not require any more processing of the data, such as a shift-and-mask.

The Read Programmable Table 200 may be stored in any type of memory or storage element that is large enough to hold the information. A simple RAM block or a fast register file may be used. The functionality of the Read Programmable Table 200 will be discussed in further detail in FIG. 8.

In general, for each bit on the DO bus 150, one bit-selector block 185 may be included in the system 104P. Each multiplexer 187 of each bit-selector block 185, may have as inputs, the number of storage elements 161 in the array of storage elements 160. This configuration provides for the maximum in flexibility of implementation. In general, the hardware discussed in the system 104P, may be configured to specifications of the processor 60. Programmability for each application may be done on the Read Programmable Table 200, which will be discussed shortly.

In an alternative embodiment, a second input (not shown) may be received by the Read Programmable Table 200. The second input may be used to index various sections of the Read Programmable Table 200. In essence, a table of tables, one table for each index can be stored and indexed in the Read Programmable Table 200. This allows for many programmable implementations of the Read Programmable Table 200, which provides for more flexibility in the number of applications that may utilize the system 104P, mostly by allowing a large number of register formats while not consuming a large number of valuable register addresses. Each index may correspond then to a specific header format that requires processing in cases where different PDU formats may be received.

The write system 102P of the system 100P provides for the reverse functionality of the read side. The write system 102P includes a Write Programmable Table 300 that provides a set of control signals to a write selector block 170 that includes an array of bit-selector blocks 175. Each bit-selector block 175 may be configured to select which bit of the DI bus 130 will be stored in which storage element 161 of the array 160, provided the storage element 161 is enabled to be written to at the time. In this example, 32 bit-selector blocks 175 are included in the system 102P, one for each storage element 161 in the array 160. Obviously, the number of bit-selector blocks 175 may vary with the size of the array 160.

Each bit-selector block 175 may include an M to 1 multiplexer 177 for providing one of the bits of the DI bus 130 to a particular storage element 161, M being the size of the DI bus 130. The multiplexer 177 is controlled by a select line that is provided by the Write Programmable Table 300. A simple AND gate 176 provides for an enable signal to the storage element 161. The AND gate 176 may receive as input a Write Enable signal 110 and an enable signal from the Write Programmable Table 300. The Write Enable signal 110 may carry a global write command from the control unit 84 (See FIG. 4). Each enable signal from the Write Programmable Table 300 may signal if that particular storage element 161 should be written to in that instruction.

Similar to the Read Programmable Table 200, the Write Programmable Table 300 may receive as an input a desired register format 120, which may be any register format 45 or 46 as discussed in relation to the packed view 30 and the unpacked view 40 of FIG. 2. The system 102P also receives, as an input, the data to be written via the DI bus 130, as well as a Write Enable signal 110. The Write Programmable Table 300 dictates which of the 32 storage elements 161 of the array 160 will be written to, and with which bit of the DI bus 130. The system 102P is capable of writing the contents of the DI bus 130 in one clock cycle, plus any delay in the operation logic of the bit-selector block 175, which is typically minimal.

The Write Programmable Table 300 may be stored in any type of memory or storage element that is large enough to hold the information. A simple RAM block or a fast register file may be used. The functionality of the Write Programmable Table 300 will be discussed in further detail in FIG. 9.

In an alternative embodiment, similar to the Read Programmable Table 200, a second input (not shown) may be received by the Write Programmable Table 300. The second input may be used to index various sections of the Write Programmable Table 300. In essence, a table of tables, one table for each index can be stored and indexed in the Write Programmable Table 300. This allows for many programmable implementations of the Write Programmable Table 300, which provides for more flexibility in the number of applications that may utilize the system 102P, mostly by allowing a large number of register formats while not consuming a large number of valuable register addresses.

Each index may correspond then to a specific header format that requires processing in cases where different PDU formats may be received.

Figure 12:
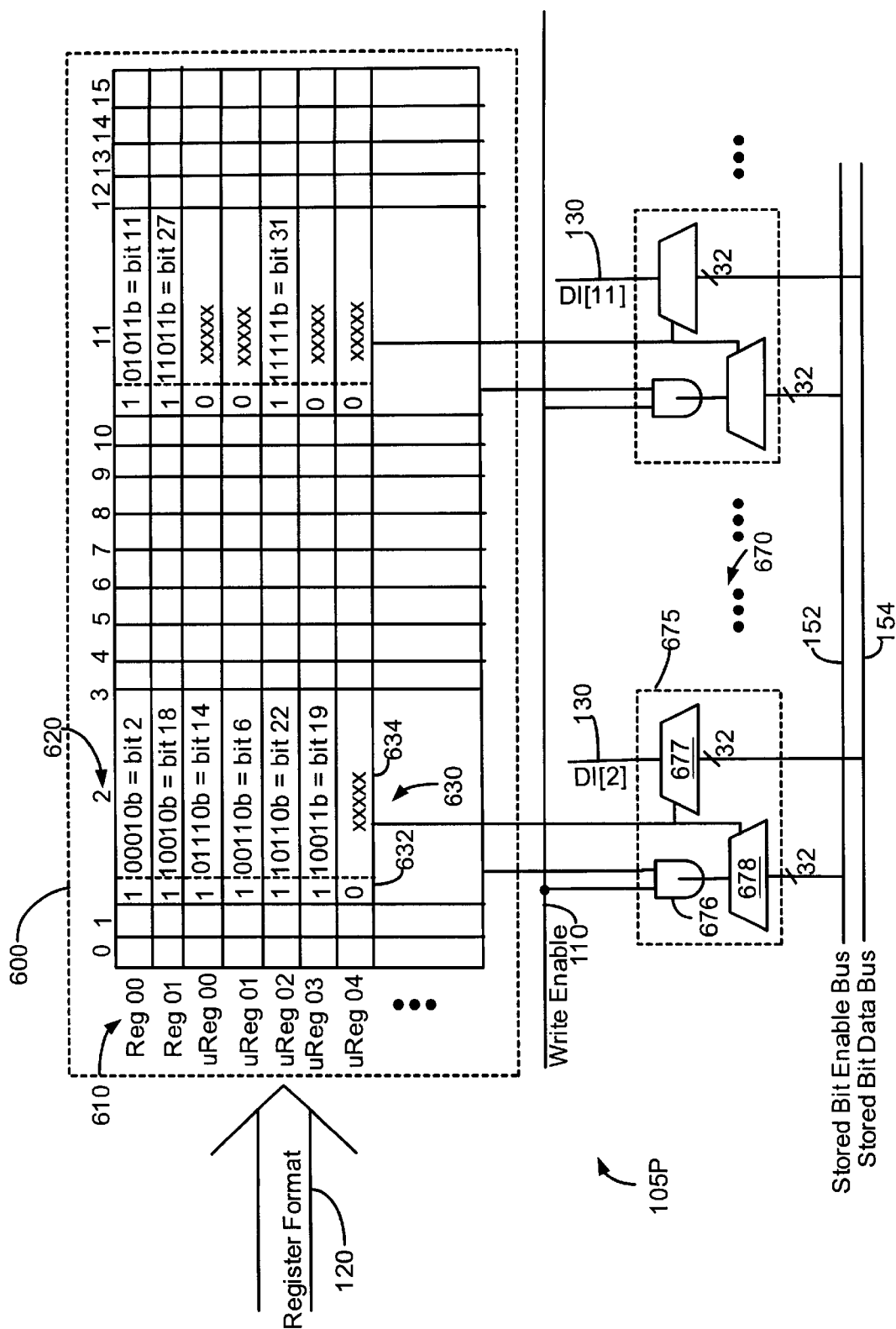
FIG. 12 is a schematic illustrating another embodiment of a programmable implementation of the parsing and modifying system of FIG. 6.

In another embodiment, to be discussed in relation to FIG. 12, the write system 102P and the parsing system 104P may be integrated by utilizing the same look-up-table. In this embodiment, the circuitry in the read and write selector blocks may be altered to account for this. As mentioned, this will be discussed later.

Figure 8:
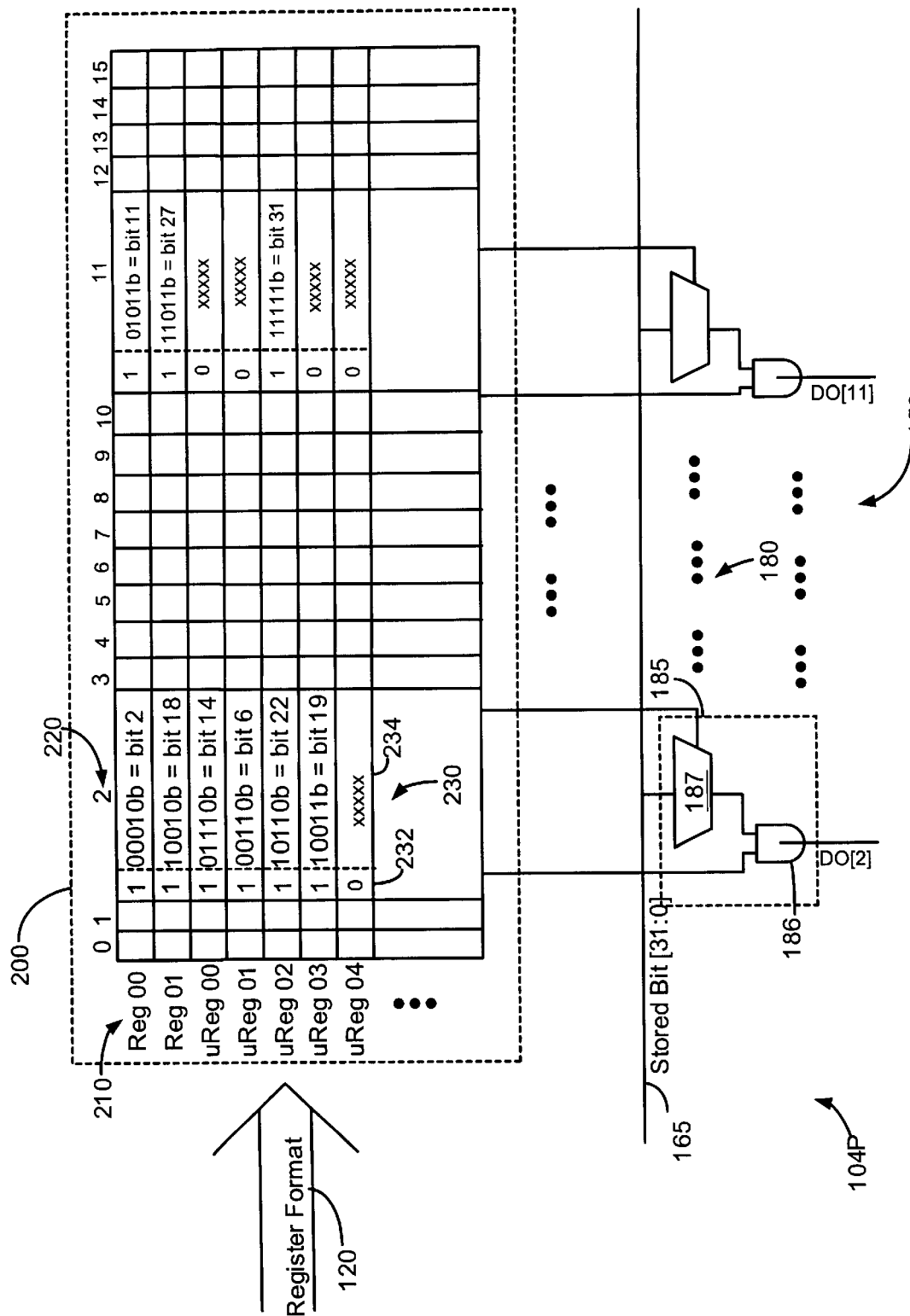
FIG. 8 is a schematic further illustrating a Read Programmable Table of the system for parsing data of FIG. 7.

FIG. 8 is a schematic further illustrating the Read Programmable Table 200 of the system 104P for parsing data of FIG. 7. As discussed in FIG. 7, the Read Programmable Table 200 may be programmed to select which storage elements of the array of storage elements 160 to read from as well as selecting where on the DO bus 150 each bit of read data should be placed. The programming of the Read Programmable Table 200 may vary with each application.

In the preferred embodiment, the Read Programmable Table 200 stores bit-level mapping information related to the array of storage elements 160, where the mapping information is stored in a matrix structure of address records 230. The mapping information is related to the specific application in use. In this example, a UNI ATM may be the specific application. The mapping information may be changed for other applications. Each address record 230 may include a valid, or enable bit 232 and a storage element number field 234. The table 200 may be queried by inputting a desired register format 120. Each row of the table 200 correlates to a register format 210, where collectively the register formats comprise the packed and unpacked views, 30 and 40, of the data (See FIG. 2). The columns of the table 200, correlate to the bits of the DO bus 150. Each bit 220 of each register format 210 may be mapped to a particular storage element 161 of the array of storage elements 160 and accessed via the stored-bit bus 165.

The valid bit 232 signifies whether any bit 220 of a particular register format 210 is valid. If not, the corresponding DO bit is automatically written to zero. Take for example, from the unpacked view 40 of FIG. 2, uReg03, which carries the PT field. In the 16-bit register uReg 03, only the three lsb carry valid data. The remaining portion carry 0's. The valid bit 232 can signify this and thus write a data 0 to the DO bus 150 for each unused bit (the 13 msb in this example). The valid bit 232 is provided to the AND gate 186 of the corresponding bit-selector block 185.

In this embodiment, 32 storage elements 161 comprise the array of storage elements 160, which correlates to the stored-bit array 20, thus five bits are needed for the stored-bit number field 234 ($\log_2 32$ 5). As an example, bit 2, the $3^{rd}$ bit of the register format Reg 01 of the packed view 30 is the PT bit [1] which is stored in the stored-bit array 20 as bit 18. The binary representation of bit 18 (10010) is the value of the storage element number field 234 for this address record 230. PT bit [2] can be accessed via uReg03 of the unpacked view 40. PT bit [2] is stored in the stored-bit array 20 at bit 19, which is the value of the storage element number field 234 of the address record 230 of uReg 03 and bit 2. The five bits of the storage element number field 234 are provided to the multiplexer 187 as a select line.

The size of the Read Programmable Table 200 may take on the following function:

(# of register formats)×(register or processor size)×($\log_2$(# of storage elements 161)+1(valid bit 232))=Size of Read Programmable Table 200 which, in this embodiment and example is 7×16×(5+1)=672 bits. This can be implemented with a 8×96 RAM block, which provides for an extra register format 210.

In practice, any register format 45 and 46 of the packed view 30 and the unpacked view 40 may be directly accessed by inputting the desired register format 120 into the Read Programmable Table 200. The output of the system 104P will then provide the contents of the desired register format 120 to the DO bus 150. The contents of the desired register format 120 may then be delivered to the ALU 61 (See FIG. 4) in a configuration desirable for processing.

Figure 9:
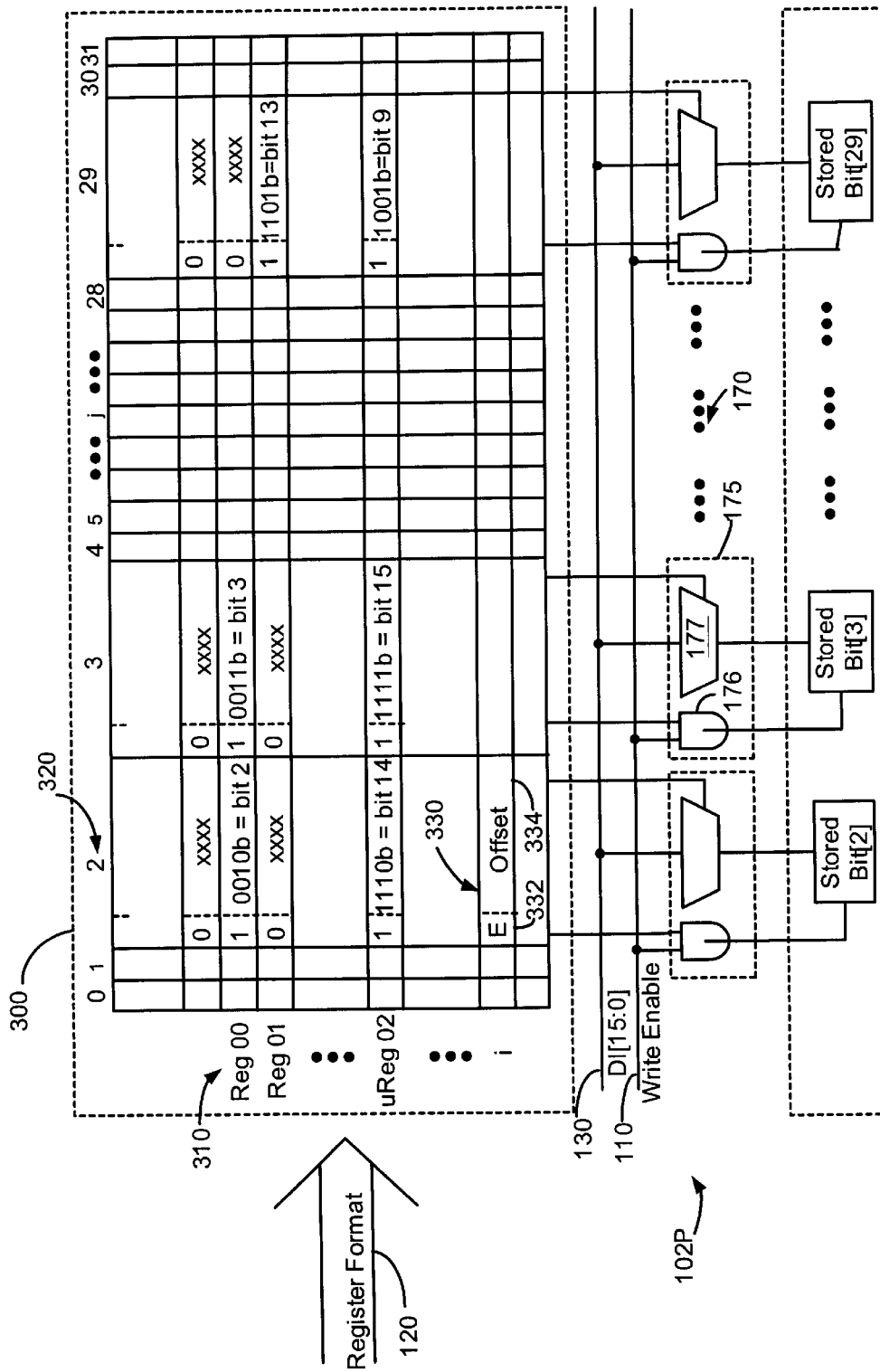
FIG. 9 is a schematic further illustrating a Write Programmable Table of the system for modifying data of FIG. 7.

FIG. 9 is a schematic further illustrating the Write Programmable Table 300 of the write system 102P of FIG. 7. As is discussed in relation to FIG. 7, the Write Programmable Table 300 may be programmed to dictate which storage element 161 of the array of storage elements 160 to write to for each bit of input data, according to a desired register format 120. A desired register format 120 corresponding to a register format 45 or 46 of the packed view 30 and the unpacked view 40 is provided to the Write Programmable Table 300. The programming of the Write Programmable Table 300 may vary with each application.

In the preferred embodiment, the Write Programmable Table 300 stores bit-level mapping information related to the array of storage elements 160, where the mapping information is stored in a matrix structure of stored-bit records 330. The mapping information is related to the specific application in use. In this example, a UNI ATM may be the specific application. The mapping information may be changed for other applications. Each stored-bit record 330 may include an enable bit 332 and a register offset field 334. Each row of the table 300 correlates to a register format 310, where collectively the register formats comprise the packed and unpacked views, 30 and 40, of the data (See FIG. 2). The columns of the table 300, correlate to the storage elements 161 of the array of storage elements 160, which in turn directly correlate to the stored-bit array 20. So, for example, the $3^{rd}$ bit of the stored-bit array 20 contains the $3^{rd}$ bit for Reg 00 and the $15^{th}$ bit for uReg 02, which is conveyed by the appropriate binary representation in the register offset field 334.

The enable bit 332 signifies whether each bit 320 of the stored-bit array 20 should be written to. If the enable bit 332 is not activated, the corresponding storage element 161 will not be written to. Take for example, bit 29 of the stored-bit array 20, which is the VCI bit [9]. VCI bit [9] is mapped to Reg 01 bit [13] of the packed view 30 and uReg 02 bit [9] of the unpacked view 40. VCI bit [9] of the stored-bit array 20 is only mapped to these two register formats 310 and so Reg 01 and uReg 02 are the only two register formats 310 of the Write Programmable table 300 to have an active enable bit 332 for bit 29. The remaining register formats 310 have a data 0 for this bit. The enable bit 332 for each column of the Write Programmable Table 300 is provided, via an enable signal, to the AND gate 176 of the corresponding bit-selector block 175. The AND gate 176 also receives the global Write Enable signal 110.

In this embodiment, the register offset field 334 is a four bit field, as its purpose is to dictate which bit of DI bus 130 should be written to regarding a particular storage element 161 of the storage element array 160. The DI bus 130, which carries the data contents of the desired register format 120, is 16 bits wide, and so the register offset field 334 requires $\log_2 16=4$ bits. In keeping with the example just described above, bit 13 of Reg 01 must be written to bit 29 of the stored-bit array 20. This can be seen with the register offset field 334 of the stored-bit record 330 of Reg 01 and bit 29—which is given the binary value for 13 of 1101. The contents of the register offset field 334 are provided to the corresponding multiplexer 177 to select which bit currently on the DI bus 130 should be written to the corresponding storage element 161.

The size of the Write Programmable Table 300 may take on the following function:

(# of register formats 310)×(# of storage elements 161)× (log$_2$(register format size)+1(enable bit))=Size of Write Programmable Table 300 which, in this embodiment and example is 7×32×(4+1)= 1120 bits. This can be implemented with a 8×160 RAM block, which provides for an extra register format 310.

In practice, the contents of any register format 45 and 46 of the packed view 30 and the unpacked view 40 may be directly written to the storage element array 160 by providing the data on the DI bus 130 and inputting the desired register format 120 into the Write Programmable Table 300. The system 102P may then write the contents of the desired register format 120 to the storage element array 160.

Figure 10A:
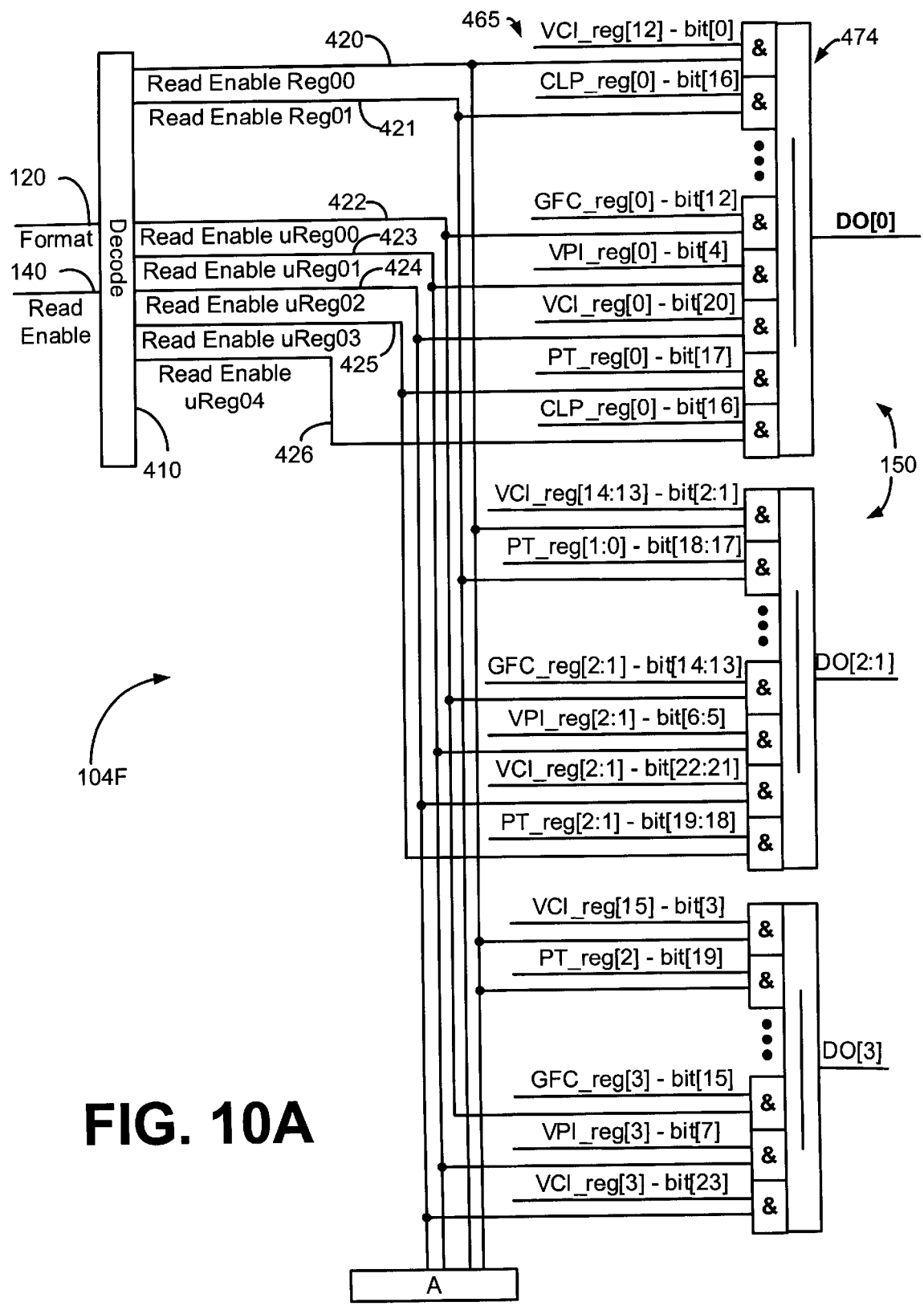
FIG. 10A–B is a schematic illustrating a fixed implementation of a system for parsing data in accordance with the present invention.
Figure 10B:
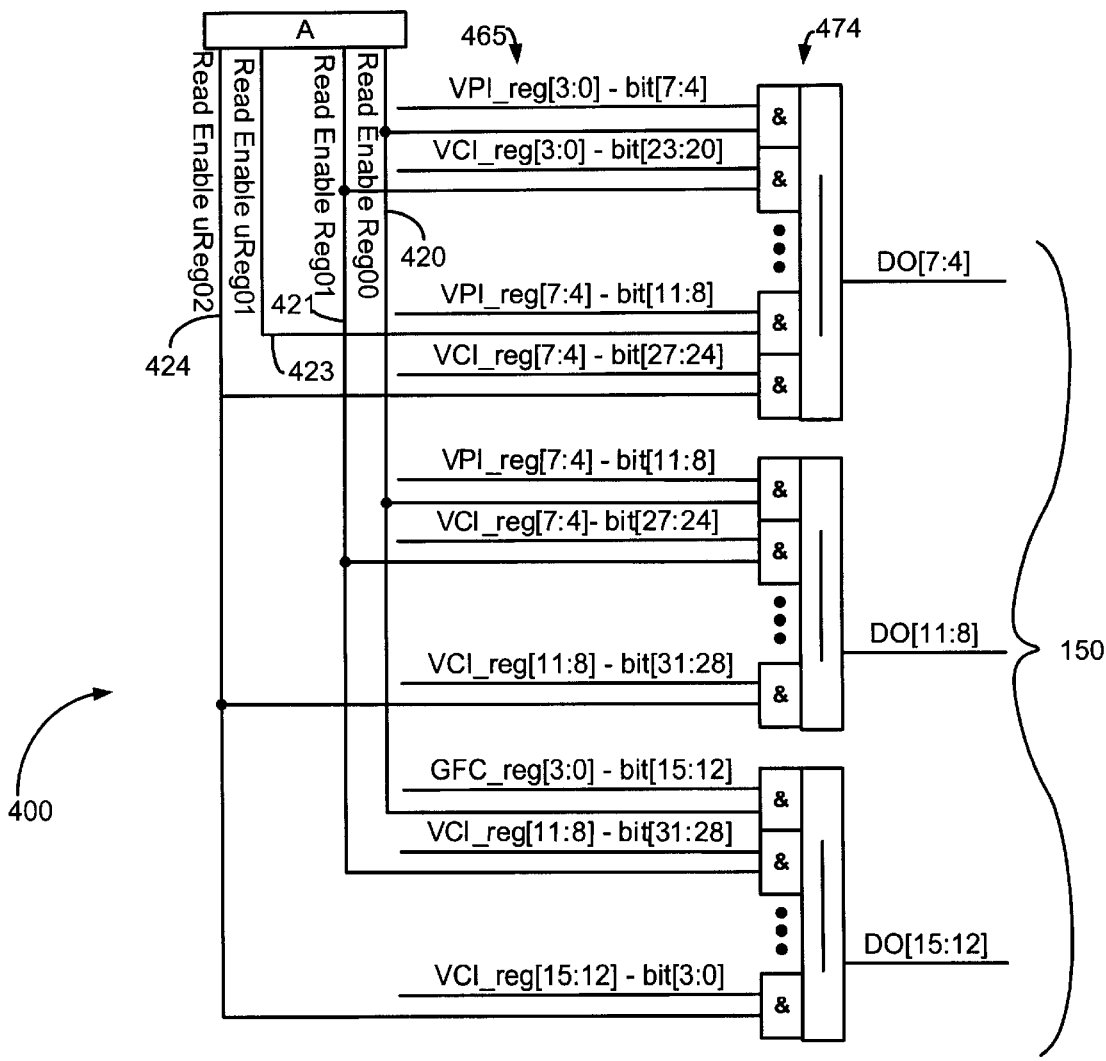

FIG. 10A–B is a schematic illustrating a fixed implementation of a system 104F for parsing data in accordance with the present invention. The fixed system 104F may be implemented in the parsing system 104 in much the same manner as the programmable system 104P. In general, the system 104F as well as with a fixed system 102F for modifying data (to be discussed in FIG. 11) utilizes the same interface with the processor 60, in that the same input and output ports and data buses are utilized.

The system 104F includes a decoder 410 that provides a set of enable signals 420–426 to a set of operational logic 474. The system 104F receives as input, a desired register format 120 as well as an optional Read Enable signal 140. The output of the system 104F is the data in the desired register format 120, which may be placed on the DO bus 150. Subsequently, the data in the desired register format 120 may be provided to the ALU 61 for further processing.

The decoder 410, in simplest terms, may be considered a de-multiplexer. The decoder 410 receives as an input the desired register format 120. The desired register format 120 acts as a select signal for a de-multiplexer to provide the Read Enable signal 140 to a selected output of the decoder 410, which may be one of the set of enable signals 420–426. The decoder 410 may have the capability of decoding a complex register format 120 into a simple switch command. In general, the decoder 410 may be configured to provide outputs to as many enable signals as are necessary for a given configuration of the system 104F. The number of necessary enable signals in the set of enable signals 420–426 may depend on the number of register formats 45 and 46 in the packed 30 and unpacked 40 views. In the continuing example, the packed 30 and unpacked views 40 include seven register formats 45 and 46 and so there are seven enable signals in the set of enable signals 420–426.

The operational logic 474 may be considered to be multiple sets of AND and OR gates. Each set of the AND and OR gates may output its own dedicated output bit or multiple output bits that collectively comprise the data in the desired register format 120. Each AND gate of each set of AND and OR gates may receive as inputs one of the enable signals from the set of enable signals 420–426 as well as the contents of a particular storage element 161. A set of stored-bit inputs 465 may be configured in such a way so that the proper storage element 161 in the storage element array 160 may be accessed and provided to the proper bit of the DO bus 150 by the system 104F. Each register format 45 and 46 of the packed 30 and unpacked 40 views may correlate to different elements 161 of the storage element array 160. The contents of the proper elements 161 of the storage element array 160 may be received as input by the operational logic 474. Determining which storage elements 161 of the storage element array 160, to read from can be done by activating the proper enable signal from the set of enable signals 420–426. For example, bit 0 of each register format 45 and 46 of the packed 30 and unpacked view 40 correlates to different elements 161 of the storage element array 160, and subsequently different bits of a given PDU. The 0 bit of Reg 00 correlates to bit 12 of the VCI field of the ATM header, which, in this example, correlates to bit 0 of the stored-bit array 20. This may be activated by enable signal 420. The 0 bit of Reg 01 correlates to the 0 bit of the CLP field of the ATM header, which correlates to bit 16 of the stored-bit array 20 and so the 16$^{th}$ storage element 161 of the storage element array 160 may be accessed. Reading from this storage element 161 may be accomplished by activating enable signal 421 which correlates to Reg 01. This general configuration can be repeated for each output bit of the system 104F.

In this example, the register formats 45 and 46 are 16 bits long and, so, at a maximum, 16 sets of AND and OR gates may be required, one for each output bit. The logic can be further minimized because of redundancy, however. For example, bit 1 and bit 2 of any register format, in this example, may be grouped together because the same storage elements 161 may be provided to the output of the operational logic 465 for each enable signal 420–426.

The fixed system 104F provides for the simplest in configuration and hardware requirements, but provides for minimum in flexibility. The system 104F, may be configured for a single implementation, in this example, the first four octets of an ATM header. A different PDU structure may require a different implementation, and subsequently, may require a different configuration of the system 104F.

Figure 11:
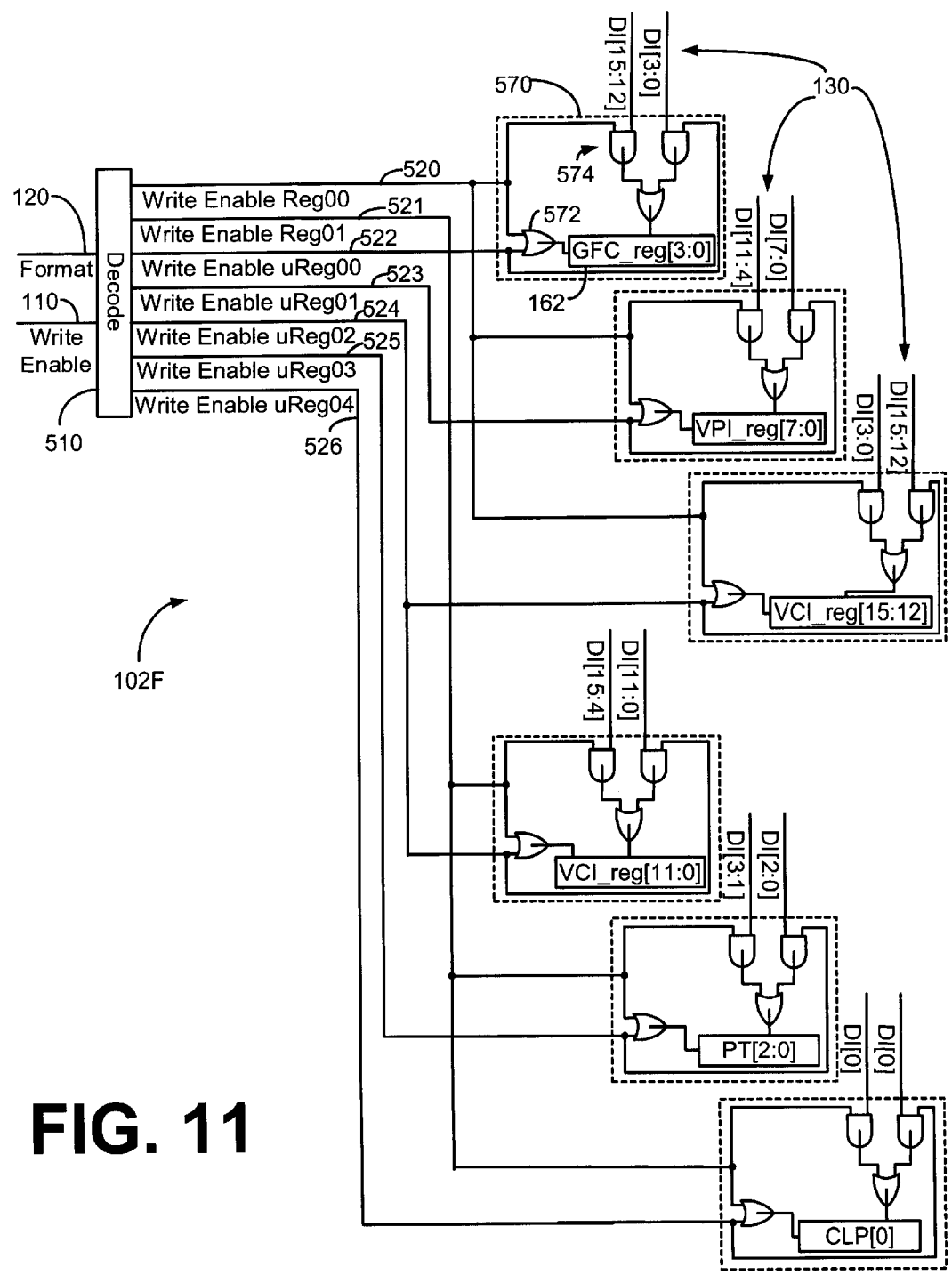
FIG. 11 is a schematic illustrating a fixed implementation of a system for modifying data in accordance with the present invention.

FIG. 11 is a schematic illustrating a fixed implementation of a system 102F for modifying data in accordance with the present invention. The fixed system 102F may be implemented in the write system 102 in much the same manner as the programmable system 102P. In general, the fixed parsing system 104F (See FIG. 10A–B) in conjunction with this fixed system 102F for modifying data utilizes the same interface with the processor 60, in that the same input and output ports and data buses are utilized.

The system 102F includes a decoder 510 that provides a set of enable signals 520–526 to an array of bit-selector blocks 570. The system 102F receives as input, a desired register format 120 and the data to be written to the array of storage elements 160. A Write Enable signal 110 is also input into the decoder 510.

The decoder 510, in simplest terms, similar to the decoder 410 of the fixed parsing system 104F, may be considered a de-multiplexer. The decoder 510 receives as an input the desired register format 120 which may act as a select signal for a de-multiplexer to provide the Write Enable signal 110 to a selected output of the decoder 510, which may be one of the set of enable signals 520–526. The decoder 510 may have the capability of decoding a complex register format 120 into a simple switch command. In general, the decoder 510 may be configured to provide outputs to as many necessary enable signals for a given configuration of the system 102F. The number of necessary enable signals in the set of enable signals 520–526 may depend on the number of register formats 45 and 46 in the packed 30 and unpacked 40 views. In the continuing example, the packed 30 and unpacked views 40 include seven register formats 45 and 46 and so there are seven enable signals in the set of enable signals 520–526.

Each bit-selector block 570 may be configured to select which set of input data bits 130 to write to a given set of storage elements 162 of the array of storage elements 160. The input bits 130 contain sections of the data, where the data is selectively partitioned according to the register formats 45 and 46. The exact bits to be written depends on the desired register format 120 itself. For example, the GFC field of an ATM header requires four bits. In the stored-bit array 20, the GFC field is stored in bits 15:12. Only two register formats, Reg 00, of the packed view 30, and uReg 00, of the unpacked view 40, carry GFC bits. Reg 00 carries the GFC bits in bits 15:12, whereas uReg 00 carries the GFC bits in bits 3:0. The DI bus 130 carries the data, and subsequently provides either bits 15:12 of Reg 00 or bits 3:0 of uReg 00 to bits 15:12 of the stored-bit array 20, depending on the desired register format 120. The select logic 574 of the GFC[3:0] bit-selector block 570 receives as input these bits of the DI bus 130. The select logic 574 also receives the enable signals 520 and 522 which correspond to Reg 00 enable signal and uReg 00 enable signal. The decoder 510 will provide the appropriate enable signal to the select logic 574 so that the proper corresponding bits are provided to the storage elements 162. In this embodiment, simple AND and OR gates are utilized for the select logic 574. In other embodiments, other logic elements that provide the same general functionality may be utilized. Also, the two sets of input bits for each bit-selector block 570 correspond to the two views, packed 30 and unpacked 40. As mentioned earlier, more than two views may exist in a given implementation and so may require more sets of input bits.

An OR gate 572 may be found in each bit-selector block 570 to provide an enable signal to the storage elements 162. Each OR gate 572 will enable the storage elements 162 of the corresponding bit-selector block 570 when one of the appropriate enable signals of the set 520–526 is activated. In the GFC bit-selector block 570, enable signal 520 (Reg 00) and enable signal 522 (uReg 00) are input into the OR gate 572. When one of these enable signals 520 or 522 is activated, the OR gate 572 can provide this signal along to the GFC storage elements 162, which correspond to bits 15:12 of the stored-bit array 20.

The set of enable signals 520–526 are connected to the set of bit-selector blocks 570 in such a way that a fully parallel implementation of a write for a given register format 120 may be accomplished. In the optimum state, the system 102F can perform the write operation of the data in the desired register format 120 to the array of storage elements 162 in one clock cycle plus any time to access the storage elements 160, which is typically required in any parsing and modifying implementation.

Similar to the fixed parsing system 104F, the fixed system 102F provides for the simplest in configuration and hardware requirements, but provides for minimum in flexibility. The system 102F, may be configured for a single implementation, in this example, the first four octets of a UNI ATM header. A different PDU structure may require a different implementation, and subsequently, may require a different configuration of the system 102F.

FIG. 12 is a schematic illustrating another embodiment of a programmable implementation of the parsing and modifying system 100 of FIG. 6. A programmable parsing and modifying system 105P includes one look-up-table, a Write and Read Programmable Table 600, to store bit-level mapping information related to the array of storage elements 160, where the mapping information is stored in a matrix structure of address records 630. Each address record 630 may include a valid, or enable bit 632 and a storage element number field 634. The mapping information contains the same information for both the read and write of data. In general, a read selector block 180 may be connected to the Write and Read Programmable Table 600 to provide for the proper parsing of the data. A read selector block 180 (not shown) may be modified to receive a Read Enable signal, if necessary. A modified write selector block 670 may also be connected to the Write and Read Programmable Table 600 to provide for writing the proper data to the proper storage elements.

The Write and Read Programmable Table 600 may be considered similar in structure to the Read Programmable Table 200 (See FIG. 8). For either a read or write command, the table 600 may be queried by inputting a desired register format 120. Each row of the table 600 correlates to a register format 610, where collectively the register formats comprise the packed and unpacked views, 30 and 40, of the data (See FIG. 2). The columns of the table 600, correlate to the bits of the DO bus 150, in the case of a read (or parse) command and correlate to the bits of the input data in the case of a write command. Each bit 620 of each register format 610 may be mapped to a particular storage element 161. In the case of a parsing operation, the storage element number field 634 stores the location to be addressed when reading from, whereas in a write operation, the storage element number field 634 stores the location to write to. In either case, the corresponding storage element 161 is the same.

The valid bit 632 signifies whether this bit 620 of a particular register format 61 0 is valid. For a read operation, if the valid bit 632 signifies an invalid, or unused bit, the bit is automatically written to zero. Take for example, from the unpacked view 40 of FIG. 2, uReg03, which carries the PT field. In the 16-bit register uReg 03, only the first three bits carry valid data. The remaining portion carry 0's. The valid bit 632 can signify this and thus write a data 0 to the DO bus 150 for the unused bits. In the case of a write command, the valid bit 632 signifies whether each bit of the input data should be written to any storage element 161. If so, the storage element number field 634, signifies which storage element 161 to write that particular bit of the data.

The size of the Write and Read Programmable Table 600 may be the same as the Read Programmable Table 200, as both tables contain the same information.

As mentioned, a read selector block 180 may be connected to the Write and Read Programmable Table 600 to perform the parsing operations. The modified write selector block 670 may also be connected to the table 600 to perform the write operations. Each selector block 180 and 670 may receive and be enabled by a read 140 or write enable signal 110, respectively.

The modified write selector block 670 may include a bit-selector block 675 for each bit of the input data, which in this embodiment and example is 16 bits. Each bit-selector block 675 may receive a respective bit of the input data via the DI bus 130 which may be configured to provide the proper bit to each bit-selector block 675. In general, each bit-selector block 675 may be configured to enable and write the input data bit to the proper storage element 161 of the storage element array 160, in accordance with the desired register format 120. Each bit-selector block 675 may be configured to receive the mapping information from the Write and Read Programmable Table 600 to properly select the storage element 161.

Each bit-selector block may include a data de-multiplexer 677 for providing an input data bit to the appropriate storage element 161. The data de-multiplexer 677 may be coupled to a stored-bit data bus 154, which may be coupled to all of the storage elements 161 of the array 160. The data de-multiplexer 677 may receive as a select signal, the value of the storage element number field 634 of the corresponding column 620 in the table 600. An AND gate 676 may receive as input a Write Enable signal 110 and an enable signal (the valid bit 632) from the Write and Read Programmable Table 600. The Write Enable signal 110 may carry a global write command from the control unit 84 or the ALU 61 (See FIG. 4). Each enable signal from the Write Programmable Table 600 may signal if that particular storage element 161 should be written to in that instruction.

Also included in each bit-selector block 675 may be an enable de-multiplexer 678. The enable de-multiplexer 678 may receive the enable signal from the AND gate 676 and provide this to the appropriate storage element 161 so that the storage element 161 may be written to. A stored-bit enable bus 152 may connect the enable de-multiplexer 678 to each storage element 161. The enable de-multiplexer 678 may receive as a select signal, the storage element number field 634 from the Write and Read Programmable Table 600.

It should be noted, that in practice, more circuitry may be required in connection with the stored-bit enable bus 152 and the stored-bit data bus 154. For simplicity, FIG. 12 describes each storage elements 161 of the array 160 being connected to each bit-selector block 675. An array of tri-state buffers connected to the output of each de-multiplexer 677 and 678 may be required. Likewise, an OR chain or OR tree may be utilized. This added circuitry provides one connection to the array of storage elements 160 for all of the bit-selector block 675, as opposed to one for each bit-selector block 675.

It should also be noted that other possible methods could be utilized to properly select and enable the appropriate storage elements 161 to receive a particular data bit. In the simplest terms, each bit-selector block 675, 185, and 175 is made up of simple operational logic, such as AND and OR gates. The multiplexers and de-multiplexers of each bit-selector block are comprised of selectively configured operational logic. In this embodiment, as is the same in others, the circuitry in each bit-selector block 675, 185, and 175 may be judiciously configured with the circuitry of the stored-bit enable bus 152 and the stored-bit data bus 154.

It should be emphasized that the above-described embodiments of the present invention, particularly, any "preferred" embodiments, are merely possible examples of implementations set forth for a clear understanding of the principles of the invention. Many variations and modifications may be made to the above-described embodiment(s) of the invention, such as the particular configuration of the bit-selector blocks, without departing substantially from the spirit and principles of the invention. All such modifications and variations are intended to be included herein within the scope of the present invention and protected by the following claims.

What is claimed is:

1. A system for parsing data stored in an array of storage elements, the system comprising:
    a decoder configured to receive a desired register format from a plurality of register formats and further configured to activate an enable signal from a set of enable signals based on the desired register format; and
    operational logic configured to derive an array of output data bits related to the desired register format, wherein the operational logic receives as inputs the set of enable signals and selectively connected storage elements of the array of storage elements.

2. The system of claim 1, wherein each enable signal of the set of enable signals correlates to a register format of the plurality of register formats, and wherein the selectively connected storage elements are selected with respect to the plurality of register formats.

3. The system of claim 1, wherein the plurality of register formats comprises:
    a first set of register formats corresponding to a packed representation of the data; and
    a second set of register formats corresponding to an unpacked representation of the data.

4. A system for writing data to an array of storage elements, the system comprising:
    a decoder configured to receive a desired register format from a plurality of register formats and further configured to activate an enable signal from a set of enable signals based on the desired register format; and
    an array of bit-selector blocks configured to write the data to the array of storage elements in the desired register format, wherein each bit-selector block receives as inputs various selected bits of the data and selected enable signals of the set of enable signals, such that activation of one of the selected enable signals dictates which bit of the various input bits is to be written to a particular storage element.

5. The system of claim 4, wherein multiple storage elements are connected to a common bit-selector block, wherein the common bit-selector block receives as inputs various selected bits of the data and selected enable signals of the set of enable signals, such that activation of one of the selected enable signals dictates which bits of the various input bits are to be written to the multiple storage elements.

6. The system of claim 5, wherein each enable signal of the set of enable signals correlates to a register format of the plurality of register formats, and wherein the various selected bits of the data and the selected enable signals are selected with respect to the plurality of register formats.

7. The system of claim 4, wherein the plurality of register formats comprises:
    a first set of register formats corresponding to a packed representation of the data; and
    a second set of register formats corresponding to an unpacked representation of the data.

8. A system for parsing and modifying data stored in an array of storage elements, the system comprising:
    a read decoder configured to receive a desired register format from a plurality of register formats and further configured to activate a read-enable signal from a set of read-enable signals based on the desired register format;
    operational logic configured to derive an array of output data bits related to the desired register format, wherein the operational logic receives as inputs the set of read-enable signals and selectively connected storage elements of the array of storage elements;
    a write decoder configured to receive a desired register format from the plurality of register formats and further configured to activate a write-enable signal from a set of write-enable signals based on the desired register format; and
    an array of bit-selector blocks configured to write the data to the array of storage elements in the desired register format, wherein each bit-selector block receives as inputs various selected bits of the data and selected write-enable signals of the set of write-enable signals, such that activation of one of the selected write-enable signals dictates which bit of the various input bits is to be written to a particular storage element.

9. The system of claim 8, wherein each read-enable signal of the set of read-enable signals correlates to a register format of the plurality of register formats, and wherein the selectively connected storage elements are selected with respect to the plurality of register formats.

10. The system of claim 8, wherein each write-enable signal of the set of write-enable signals correlates to a register format of the plurality of register formats, and wherein the various selected bits of the data and the selected write-enable signals are selected with respect to the plurality of register formats.

11. The system of claim 8, wherein the plurality of register formats comprises:
   a first set of register formats corresponding to a packed representation of the data; and
   a second set of register formats corresponding to an unpacked representation of the data.

12. A system for parsing data stored in an array of storage elements, the system comprising:
   a read programmable table (RPT) preprogrammed with bit-level mapping information related to the array of storage elements; and
   a read selector block coupled to the RPT and configured to, when enabled, read and output contents of appropriately selected storage elements of the array of storage elements based upon the bit-level mapping information provided by the RPT.

13. The system of claim 12, wherein the bit-level mapping information comprises a record for each bit of a plurality of register formats, wherein each register format provides a different parsing format of the data.

14. The system of claim 13, wherein each record comprises a field signifying a proper storage element of the array of storage elements from which to retrieve data.

15. The system of claim 13, wherein the RPT is configured to be queried by a desired register format of the plurality of register formats, and wherein the bit-level mapping information provided to the read selector block is related to the desired register format.

16. The system of claim 15, wherein the read selector block comprises a bit-selector block for each bit of the desired register format, wherein each bit-selector block comprises means for selecting a proper storage element of the array of storage elements from which to retrieve data based on the provided bit-level mapping information.

17. The system of claim 13, wherein the bit-level mapping information and the plurality of register formats are application specific.

18. The system of claim 13, wherein the plurality of register formats comprises:
   a first set of register formats corresponding to a packed representation of the data; and
   a second set of register formats corresponding to an unpacked representation of the data.

19. A system for writing data to an array of storage elements, the system comprising:
   a write programmable table (WPT) preprogrammed with bit-level mapping information related to the array of storage elements; and
   a write selector block coupled to the WPT and configured to, when enabled, write selected bits of the data to particular storage elements of the array of storage elements based upon the bit-level mapping information provided by the WPT.

20. The system of claim 19, wherein the bit-level mapping information comprises:
   write-enable information communicating which storage elements of the array of storage elements shall be enabled for each of a plurality of register formats; and
   bit selection information communicating which bit of the data to write to each enabled storage element for each of the plurality of register formats, wherein each register format provides a different write format of the data.

21. The system of claim 20, wherein the WPT is configured to be queried by a desired register format of the plurality of register formats, and wherein the bit-level mapping information provided to the write selector block is related to the desired register format.

22. The system of claim 21, wherein the write selector block comprises a bit-selector block for each storage element of the array of storage elements, wherein each bit-selector block comprises means for selecting the proper bit of data to write to its respective storage element based upon the provided bit-level mapping information.

23. The system of claim 20, wherein the bit-level mapping information and the plurality of register formats are application specific.

24. The system of claim 20, wherein the plurality of register formats comprises:
   a first set of register formats corresponding to a packed representation of the data; and
   a second set of register formats corresponding to an unpacked representation of the data.

25. A system for parsing and modifying data stored in an array of storage elements, the system comprising:
   a parsing system configured to access the data stored in selected storage elements of the array of storage elements and output the data in one of a plurality of register formats; and
   a write system configured to write data to selected storage elements of the array of storage elements, wherein the data is received in one of the plurality of register formats;
   wherein the plurality of register formats comprises:
      a first set of register formats corresponding to a packed representation of the data; and
      a second set of register formats corresponding to an unpacked representation of the data.

26. The system of claim 25, wherein the parsing system comprises:
   a read programmable table (RPT) preprogrammed with bit-level location information related to the array of storage elements; and
   a read selector block coupled to the RPT and configured to, when enabled, read and output contents of the selected storage elements based upon the bit-level location information provided by the RPT.

27. The system of claim 26, wherein the bit-level location information comprises a reference to the proper storage element from which to retrieve data for each bit of the plurality of register formats.

28. The system of claim 27, wherein the RPT is configured to be queried by a desired register format of the plurality of register formats, and wherein the bit-level location information provided to the read selector block is related to the desired register format.

29. The system of claim 28, wherein the read selector block comprises a bit-selector block for each bit of the desired register format, wherein each bit-selector block comprises means for selecting the proper storage element from which to retrieve data based on the provided bit-level location information.

30. The system of claim 25, wherein the write system comprises:
   a write programmable table (WPT) preprogrammed with bit-level destination information related to the array of storage elements; and
   a write selector block coupled to the WPT and configured to, when enabled, write particular bits of the data to the selected storage elements based upon the bit-level destination information provided by the WPT.

31. The system of claim 30, wherein the bit-level destination information comprises:
   write-enable information communicating which storage elements of the array of storage elements shall be enabled for each of the plurality of register formats; and
   bit selection information communicating which bit of the data to write to each enabled storage element for each of the plurality of register formats.

32. The system of claim 31, wherein the WPT is configured to be queried by a desired register format of the plurality of register formats, and wherein the bit-level destination information provided to the write selector block is related to the desired register format.

33. The system of claim 32, wherein the write selector block comprises a bit-selector block for each storage element of the array of storage elements, wherein each bit-selector block comprises means for selecting the proper bit of data to write to its respective storage element based upon the provided bit-level destination information.

34. The system of claim 25, wherein the plurality of register formats are application specific.

35. A system for parsing and modifying data stored in an array of storage elements, the system comprising:
   means for receiving a desired parsing format of a plurality of register formats, wherein the data is to be output in the desired parsing format;
   means for determining which storage element is to be accessed for each bit of the desired parsing format; and
   means for outputting the data in the desired parsing format;
   wherein the plurality of register formats comprises:
      a first set of register formats corresponding to a packed representation of the data; and
      a second set of register formats corresponding to an unpacked representation of the data.

36. The system of claim 35, wherein the means for determining comprises:
   means for querying a look-up table with the desired parsing format, wherein the look-up table stores mapping information indicating which storage element is to be accessed for each bit of each register format of the plurality of register formats.

37. The system of claim 36, further comprising:
   means for receiving an index relating to a subsection of the mapping information, wherein each subsection of the mapping information comprises a different plurality of register formats; and
   wherein the means for determining further comprises:
      means for querying the look-up-table with the desired register format of the plurality of register formats related to the received index.

38. The system of claim 36, wherein the means for outputting the data comprises:
   means for receiving the mapping information; and
   means for accessing the array of storage elements by utilizing the mapping information.

39. The system of claim 35, further comprising:
   means for receiving the data to be written;
   means for receiving a desired write format of the plurality of register formats, wherein the data to be written to the array of storage elements is in the desired write format;
   means for determining which storage element is to be written to for each bit of the desired write format; and
   means for providing for each bit of the data to be written to a proper storage element based upon the desired write format.

40. The system of claim 39, wherein the means for determining comprises:
   means for querying a look-up table with the desired write format, wherein the look-up table stores mapping information indicating which storage element is to be written to for each bit of each register format of the plurality of register formats.

41. The system of claim 40, further comprising:
   means for receiving an index relating to a subsection of the mapping information, wherein each subsection of the mapping information comprises a different plurality of register formats; and
   wherein the means for determining further comprises:
      means for querying the look-up-table with the desired register format of the plurality of register formats related to the received index.

42. The system of claim 40, wherein the means for providing comprises:
   means for receiving the mapping information; and
   means for enabling selected storage elements to receive selected bits of the data based on the received mapping information.

43. A method for parsing and modifying data stored in an array of storage elements, the method comprising:
   receiving a desired parsing format of a plurality of register formats, wherein the data is to be output in the desired parsing format;
   determining which storage element is to be accessed for each bit of the desired parsing format; and
   outputting the data in the desired parsing format;
   wherein the plurality of register formats comprises:
      a first set of register formats corresponding to a packed representation of the data; and
      a second set of register formats corresponding to an unpacked representation of the data.

44. The method of claim 43, wherein determining comprises:
   querying a look-up table with the desired parsing format, wherein the look-up table stores mapping information indicating which storage element is to be accessed for each bit of each register format of the plurality of register formats.

45. The method of claim 44, further comprising:
   receiving an index relating to a subsection of the mapping information, wherein each subsection of the mapping information comprises a different plurality of register formats; and
   wherein determining further comprises:
      querying the look-up-table with the desired register format of the plurality of register formats related to the received index.

46. The method of claim 44, wherein outputting the data comprises:

receiving the mapping information; and accessing the array of storage elements by utilizing the mapping information.

47. The method of claim 43, further comprising:

receiving the data to be written;

receiving a desired write format of the plurality of register formats, wherein the data to be written to the array of storage elements is in the desired write format;

determining which storage element is to be written to for each bit of the desired write format; and providing for each bit of the data to be written to a proper storage element based upon the desired write format.

48. The method of claim 47, wherein determining comprises:

querying a look-up table with the desired write format, wherein the look-up table stores mapping information indicating which storage element is to be written to for each bit of each register format of the plurality of register formats.

49. The method of claim 48, further comprising:

receiving an index relating to a subsection of the mapping information, wherein each subsection of the mapping information comprises a different plurality of register formats; and wherein determining further comprises:

querying the look-up-table with the desired register format of the plurality of register formats related to the received index.

50. The method of claim 48, wherein providing comprises:

receiving the mapping information; and enabling selected storage elements to receive selected bits of the data based on the received mapping information.

* * * * *